(12) United States Patent
Ma et al.

(10) Patent No.: US 10,805,606 B2
(45) Date of Patent: Oct. 13, 2020

(54) ENCODING METHOD AND DEVICE AND DECODING METHOD AND DEVICE

(71) Applicant: Huawei Technologies Co., Ltd., Shenzhen (CN)

(72) Inventors: Xiang Ma, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 16/234,107

(22) Filed: Dec. 27, 2018

(65) Prior Publication Data

US 2019/0158825 A1 May 23, 2019

Related U.S. Application Data

(63) Continuation of application No. PCT/CN2017/090067, filed on Jun. 26, 2017.

(30) Foreign Application Priority Data

Jun. 27, 2016 (CN) .......................... 2016 1 0482290

(51) Int. Cl.
*H04N 19/105* (2014.01)
*H04N 19/597* (2014.01)
(Continued)

(52) U.S. Cl.
CPC ......... *H04N 19/105* (2014.11); *H04N 19/167* (2014.11); *H04N 19/176* (2014.11); *H04N 19/597* (2014.11); *H04N 19/70* (2014.11)

(58) Field of Classification Search
None
See application file for complete search history.

(56) References Cited

U.S. PATENT DOCUMENTS

2006/0034523 A1   2/2006  Park
2006/0251336 A1*  11/2006 Lelescu ..................... G06T 7/80
                                                       382/276
(Continued)

FOREIGN PATENT DOCUMENTS

CN    101002474 A    7/2007
CN    102209241 A   10/2011
WO    2018064967 A1   4/2018

OTHER PUBLICATIONS

Choi et al., "Proposed Working Draft for Omnidirectional Media Application Format (OMAF)", 115. MPEG Meeting; May 30, 2016-Jun. 3, 2016; Geneva; (Motion Picture Expert Group or ISO/IEC JTC1/SC29/WG11), No. m38584, May 25, 2016. (Year: 2016).*

(Continued)

*Primary Examiner* — William C Vaughn, Jr.
*Assistant Examiner* — Joseph Daniel A Towe
(74) *Attorney, Agent, or Firm* — Conley Rose, P.C.

(57) ABSTRACT

A decoding method applied to the field of video processing, where the decoding method includes receiving an encoded bitstream of a two-dimensional panorama picture, determining an applicable spatial layout format of the two-dimensional panorama picture, parsing the encoded bitstream of the two-dimensional panorama picture to determine whether a spatial position relationship between sub-pictures in the two-dimensional panorama picture in the applicable spatial layout format is a default spatial position relationship, and decoding the encoded bitstream of the two-dimensional panorama picture based on the applicable spatial layout format and the default spatial position relationship when the spatial position relationship between the sub-pictures in the two-dimensional panorama picture in the applicable spatial layout format is the default spatial position relationship.

20 Claims, 9 Drawing Sheets

(51) Int. Cl.
  *H04N 19/70* (2014.01)
  *H04N 19/167* (2014.01)
  *H04N 19/176* (2014.01)

(56) References Cited

U.S. PATENT DOCUMENTS

2015/0341552 A1 11/2015 Chen et al.
2017/0280126 A1* 9/2017 Van der Auwera ..................... G06T 3/0056

OTHER PUBLICATIONS

Wang, Xin., "Adaptive Streaming of Omnidirectional Video in DASH", 115. MPEG Meeting; May 30, 2016-Jun. 3, 2016; Geneva; (Motion Picture Expert Group or ISO/IEC JTC1/SC29/WG11), No. m38670, May 31, 2016. (Year: 2016).*
Choi, B., et al., "Proposed working draft for omnidirectional media application format (OMAF)", (Motion Picture Expert Group or ISO/IEC JTC1/SC29/WG 11), MPEG2016/M38584, XP030066936, May 25, 2016, 12 pages.
Wang, X., "Adaptive Streaming of Omnidirectional Video in DASH", (Motion Picture Expert Group or ISO/IEC JTC1/SC29/WG 11), MPEG2016/M38670, XP030067022, May 31, 2016, 19 pages.
Foreign Communication From a Counterpart Application, European Application No. 17819205.0, Extended European Search Report dated May 20, 2019, 9 pages.
"Series H: Audiovisual and Multimedia Systems, Infrastructure of audiovisual services—Coding of moving video, Video coding for low bit rate communication," ITU-T H.263, Jan. 2005, 226 pages.
"Series H: Audiovisual and Multimedia Systems, Infrastructure of audiovisual services—Coding of moving video, Advanced video coding for generic audiovisual services," ITU-T H.264, Feb. 2016, 807 pages.
"Series H: Audiovisual and Multimedia Systems, Infrastructure of audiovisual services—Coding of moving video, High efficiency video coding," ITU-T H.265, Apr. 2015, 634 pages.
"Series H: Audiovisual and Multimedia Systems Coding of moving video, Implementors Guide for H.263: Video coding for low bit rate communication," ITU-T H.263 Implementors' Guide, Aug. 5, 2005, 10 pages.
Yuming, M., "The Technique and System for the Generation of Camouflage Scenario," Zhejiang University, Computer Application Technology, Feb. 2014, 85 pages.
Machine Translation and Abstract of Chinese Publication No. CN102209241, Oct. 5, 2011, 22 pages.
Foreign Communication From a Counterpart Application, PCT Application No. PCT/CN2017/090067, English Translation of International Search Report dated Sep. 22, 2017, 2 pages.
Foreign Communication From a Counterpart Application, PCT Application No. PCT/CN2017/090067, English Translation of Written Opinion dated Sep. 22, 2017, 5 pages.

* cited by examiner

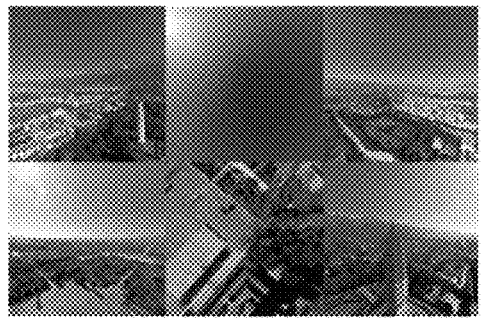 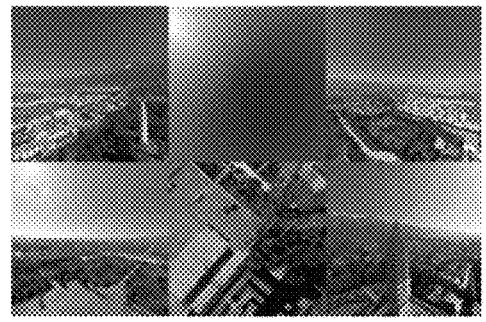
FIG. 7A　　　　　　　　　　　FIG. 7B
| Type_idx | 0 | 1 | 2 | 3 |
|---|---|---|---|---|
| | 1x6 | 2x3 | 3x2 | 6x1 |
| Position order | 0,1,2,3,4,5 (vertical) | 0,1/2,3/4,5 | 0,1,2/3,4,5 | 0,1,2,3,4,5 (horizontal) |
FIG. 8

| Positions of sub-pictures in a two-dimensional panorama picture | 3x2 spatial layout format |
|---|---|
| 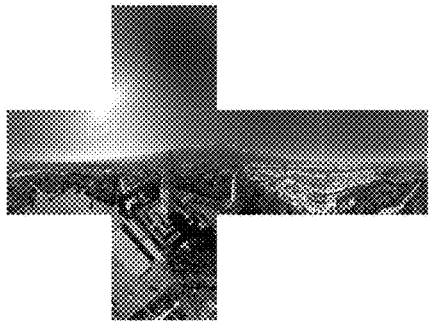 |  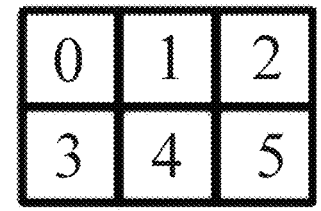 |

| Step #0: num_of_layout_face_minus1 = 5 ||||
|---|---|---|---|
| Step #1 | Remaining faces in cubic face array | layout_face[i] | layout_rotation[i] |
| i = 0 | {Left(0), Front(1), Right(2), Rear(3), Top(4), Bottom(5)} | 0 {Left} | 0 |
| i = 1 | {Front(0), Right(1), Rear(2), Top(3), Bottom(4)} | 0 {Front} | 0 |
| i = 2 | {Right(0), Rear(1), Top(2), Bottom(3)} | 0 {Right} | 0 |
| i = 3 | {Rear(0), Top(1), Bottom(2)} | 1 {Top} | 1 |
| i = 4 | {Rear(0), Bottom(1)} | 0 {Rear} | 2 |
| Step #2: The last position of the layout is the cubic face {Bottom} and layout_rotation[num_of_layout_face_minus1]= 1 ||||

FIG. 10

ENCODING METHOD AND DEVICE AND DECODING METHOD AND DEVICE

CROSS-REFERENCE TO RELATED APPLICATIONS

This application is a continuation of International Patent Application No. PCT/CN2017/090067 filed on Jun. 26, 2017, which claims priority to Chinese Patent Application No. 201610482290.7 filed on Jun. 27, 2016. The disclosures of the aforementioned applications are hereby incorporated by reference in their entireties.

TECHNICAL FIELD

The present disclosure relates to the field of video encoding, decoding, and compression, and in particular, to an encoding method and apparatus and a decoding method and apparatus applicable to encoding and decoding of a panorama picture.

BACKGROUND

A digital video capability may be integrated into a wide range of apparatuses including digital televisions, digital live systems, wireless broadcasting systems, personal digital assistants (PDAs), laptop or desktop computers, tablet computers, electronic book (e-book) readers, digital cameras, digital recording apparatuses, digital media players, video game apparatuses, video game consoles, cellular or satellite radio telephones, video conference apparatuses, video stream apparatuses, and the like. A digital video apparatus implements video compression technologies, for example, video compression technologies described in standards defined by Moving Picture Experts Group (MPEG)-2, MPEG-4, International Telecommunication Union (ITU)-TH.263, ITU-TH.264/MPEG-4 Part 10: Advanced Video Coding (AVC), and ITU-TH.265: High Efficiency Video Coding (HEVC) standards and extension parts of the standards, to more efficiently transmit and receive digital video information. The video apparatus may transmit, receive, encode, decode, and/or store digital video information more efficiently by implementing such video encoding and decoding technologies.

In the field of video encoding and decoding, a frame refers to an entire picture. After being formed into a video format frame by frame according to a particular order and frame rate, pictures may be played. After the frame rate reaches a particular rate, a time interval between two frames is less than a resolution limit of human eyes, transient visual persistence occurs, and therefore the pictures seem to dynamically appear on a screen. Compression coding of a single-frame digital picture is a basis for implementing video file compression. A digitized picture has lots of repeatedly indicated information that is referred to as redundant information. A frame of picture usually has many sections having a same or similar space structure. For example, colors of sampling points of a same object or background are closely associated and similar. In a multi-frame picture group, a frame of picture is highly correlated to a previous frame or subsequent frame of the frame of picture, and there is a small difference in pixel values of description information. These are parts that can be compressed. Similarly, the video file includes not only spatially redundant information but also a large amount of temporally redundant information. This is caused by a composition structure of a video. For example, a frame rate of video sampling is usually 25 frames per second to 30 frames per second, and may be 60 frames per second in a special case. That is, a sampling time interval between two neighboring frames is at least 1/30 second to 1/25 second. Pictures obtained through sampling in such a short time basically have massive similar information, and the pictures are greatly correlated. However, independent records are in an original digital video recording system, and such coherent and similar features are not considered or used, causing a huge amount of repeated and redundant data. In addition, researches have shown that from the perspective of a psychological feature, visual sensitivity of human eyes, video information also has a part that can be compressed, that is, visual redundancy. The visual redundancy means properly compressing a video bitstream using a visual feature that human eyes are more sensitive to a luminance change than to a chrominance change. In a high-luminance area, sensitivity of human eye vision to the luminance change assumes a descending trend. The human eye vision turns to be more sensitive to an edge part of an object than to an inner area, and more sensitive to an entire structure than to a change of inner details. A final service target of video picture information is a human group. Therefore, compression processing may be performed on original video picture information by fully using such features of human eyes to achieve a better compression effect. In addition to the spatial redundancy, temporal redundancy, and visual redundancy that are mentioned above, video picture information also has a series of redundant information, such as information entropy redundancy, structural redundancy, knowledge redundancy, and importance redundancy. An objective of video compression coding is to remove redundant information from a video sequence using various technical methods to reduce storage space and save transmission bandwidth.

In terms of a current technical development situation, a video compression processing technology mainly includes intra-frame prediction, inter-frame prediction, transform and quantization, entropy encoding, deblocking filtering processing, and the like. In existing international video compression coding standards, there are mainly four types of mainstream compression coding manners in existing video compression coding standards chrominance sampling, predictive coding, transform coding, and quantization coding.

Chrominance sampling: This manner fully uses visual and psychological features of human eyes, and starts to attempt to maximally reduce, from bottom-layer data representation, a data volume described by a single element. In a television system, luminance-chrominance-chrominance (YUV) color coding is mostly used and is a standard widely used in a European television system. A YUV color space includes a luminance signal Y and two color difference signals U and V. The three components are independent of each other. A representation manner in which YUV color modes are separate from each other is more flexible, occupies a small quantity of bandwidth for transmission, and is advantageous over a conventional red green blue (RGB) color model. For example, a YUV 4:2:0 form indicates that two chrominance components U and V together account for only half a luminance component Y in both horizontal and vertical directions, that is, four sampling pixel points have four luminance components Y and only one chrominance component U and one chrominance component V. Such a representation further reduces the data volume to only approximately 33% of an original data volume. One of widely used video data compression manners at present is to implement video compression through chrominance sampling using the physiological and visual features of the human eyes.

Predictive coding: A currently to-be-encoded frame is predicted using data information of a previously encoded frame. A predictor is obtained through prediction and is not exactly equal to an actual value. There is a residual value between the predictor and the actual value. More appropriate prediction indicates a predictor closer to the actual value and a smaller residual value. In this way, a data volume can be greatly reduced by encoding the residual value. An initial picture is restored or reconstructed by adding the residual value to the predictor during decoding performed on a decoder side. This is a basic conceptive method of the predictive coding. In a mainstream coding standard, the predictive coding is classified into two basic types, intra prediction and inter prediction.

Transform coding: Original spatial-domain information is not directly encoded, and instead, a sampled value of information is converted from a current domain to another domain defined by a person (which is usually referred to as a transform domain) according to a form of transform function, and then compression coding is performed according to a distribution feature of the information in the transform domain. A reason for using the transform coding is that video image data usually has a large data correlation in a spatial domain, resulting in massive redundant information and requiring a large quantity of bits for direct encoding. The data correlation is greatly reduced in the transform domain such that redundant information in encoding is reduced, and a data volume required for encoding is greatly reduced accordingly. In this way, a relatively high compression ratio can be obtained, and a relatively favorable compression effect can be achieved. Typical transform coding includes Karhunen-Loeve (K-L) transform, Fourier transform, and the like. Integer discrete cosine transform (DCT) is a transform coding manner commonly used in many international standards.

Quantization encoding: Data is not compressed in the transform coding mentioned above, and a quantization process is an effective means for data compression and is a main cause of data "loss" in lossy compression. The quantization process is a process of forcibly planning an input value having a relatively large dynamic range into an output value having a relatively small dynamic range. The quantized input value has a relatively large range and requires a relatively large quantity of bits for indication. The output value after "forcible planning" has a relatively small range, and therefore only requires a small quantity of bits for indication. Each quantized input is normalized into a quantized output, that is, quantized into an order of magnitude. Such an order of magnitude is usually referred to as a quantitative level (which is usually specified by an encoder).

In a coding algorithm based on a hybrid coding architecture, the foregoing compression coding manners are mixed for use. An encoder control module selects, according to local features of different picture blocks in a video frame, encoding modes used for the picture blocks. Frequency domain prediction or spatial domain prediction is performed on a block on which intra predictive coding is performed, and motion compensating prediction is performed on a block on which inter predictive coding is performed. Then, transform and quantization processing are performed on a predicted residual to form a residual coefficient. At last, a final bitstream is generated using an entropy encoder. To avoid accumulation of prediction errors, a reference signal of intra prediction or inter prediction is obtained using a decoding module on an encoder side. Dequantization and inverse transform are performed on the residual coefficient obtained after the transform and quantization, to reconstruct a residual signal. The residual signal is then added to the reference signal of prediction to obtain a reconstructed picture. Pixel correction is performed on the reconstructed picture through loop filtering, to improve encoding quality of the reconstructed picture.

In the foregoing basic coding technologies and encoding frames, a plurality of encoding technologies for different scenarios are derived, for example, a panorama encoding technology. 360-degree omnidirectional visual information in a three-dimensional space may be encoded using the encoding technology and transmitted to a receive end. The receive end decodes the received encoded data, and redisplays 360-degree omnidirectional visual content using a dedicated display device to provide an immersive visual-feeling for a user. Application of the technology facilitates emergence, application, and rapid popularization of a series of virtual reality (VR) products such as OCULUS RIFT, GEAR VR, and HTC VIVE. Correspondingly, a higher requirement is imposed on encoding technologies.

SUMMARY

The present disclosure provides encoding and decoding methods that can improve encoding and decoding efficiency. The encoding and decoding methods are applicable to encoding of a two-dimensional panorama picture, and in particular, to a case in which the two-dimensional panorama picture includes a plurality of sub-pictures and a spatial position relationship between the plurality of sub-pictures has relatively large impact on overall encoding efficiency.

According to a first aspect of the present disclosure, an encoding method is provided. The encoding method includes determining an applicable spatial layout format of a to-be-encoded two-dimensional panorama picture and a spatial position relationship between sub-pictures in the two-dimensional panorama picture in the applicable spatial layout format, determining whether the spatial position relationship between the sub-pictures in the two-dimensional panorama picture in the applicable spatial layout format is the same as a default spatial position relationship in the applicable spatial layout format, and encoding indication information used to indicate that the sub-pictures in the two-dimensional panorama picture in the applicable spatial layout format use the default spatial position relationship, and encoding the sub-pictures in the two-dimensional panorama picture based on the applicable spatial layout format and the default spatial position relationship to generate an encoded bitstream when the spatial position relationship between the sub-pictures in the two-dimensional panorama picture in the applicable spatial layout format is the same as the default spatial position relationship in the applicable spatial layout format.

In the encoding method, the default spatial position relationship between the sub-pictures in the two-dimensional panorama picture in the applicable spatial format of the two-dimensional panorama picture is introduced. Usually, the spatial position relationship between the sub-pictures in the two-dimensional panorama picture is relatively fixed. Therefore, compared with encoding a spatial position relationship between sub-pictures in the two-dimensional panorama picture one by one, this manner of using the default spatial position relationship requires only one piece of indication information to clearly describe the spatial position relationship between the sub-pictures in the two-dimensional panorama picture such that relatively high overheads of coding code-words are reduced and encoding efficiency is improved.

Based on the encoding method according to the first aspect of the present disclosure, in consideration of further reducing the overheads of coding code words, the step of determining an applicable spatial layout format of a to-be-encoded two-dimensional panorama picture may be implemented through derivation, and may include obtaining a width and a height of the two-dimensional panorama picture, and determining the applicable spatial layout format of the two-dimensional panorama picture based on an aspect ratio of the two-dimensional panorama picture and a preset correspondence table between an aspect ratio and a spatial layout format. Certainly, considering encoding complexity, a latency, and a network situation, the applicable spatial layout format of the two-dimensional panorama picture may alternatively be encoded into the bitstream using an index, and a decoder side can directly determine the applicable spatial layout format of the two-dimensional panorama picture based on the index.

Based on the encoding method according to the first aspect of the present disclosure, considering flexibility of this solution, there may be more than one default spatial position relationship, that is, there may be a plurality of default spatial position relationships to be used by the sub-pictures of the two-dimensional panorama picture. Correspondingly, the encoding method further includes encoding an index of the default spatial position relationship between the sub-pictures in the two-dimensional panorama picture, where the index of the default spatial position relationship is used to uniquely indicate one of the plurality of different default spatial position relationships. This solution has the following advantage. For different application scenarios, that is, for content covered by the two-dimensional panorama picture, the sub-pictures have different optimal default spatial position relationships. Therefore, in this case to improve the encoding efficiency, a plurality of default spatial position relationships are set for selection in the present disclosure.

Based on the encoding method according to the first aspect of the present disclosure, considering simplicity of this encoding solution, it may alternatively be considered to introduce a default spatial layout format of the two-dimensional panorama picture. Correspondingly, the encoding method includes determining whether the applicable spatial layout format of the two-dimensional panorama picture is the same as a default spatial layout format, and correspondingly, the step of determining whether the spatial position relationship between the sub-pictures in the two-dimensional panorama picture in the applicable spatial layout format is the same as a default spatial position relationship in the applicable spatial layout format also needs to be adaptively changed. Further, the step is changed to determining, depending on whether the applicable spatial layout format of the two-dimensional panorama picture is the same as the default spatial layout format, that the spatial position relationship between the sub-pictures in the two-dimensional panorama picture is the default spatial position relationship when the applicable spatial layout format of the two-dimensional panorama picture is the default spatial layout format. In the method, the spatial layout format of the two-dimensional panorama picture and the spatial position relationship between the sub-pictures in the two-dimensional panorama picture are considered in combination, to further reduce encoding overheads. In addition, encoding flexibility is considered, that is, when the spatial layout format of the two-dimensional panorama picture is not the default spatial layout format, it is still allowed to determine whether the spatial position relationship between the sub-pictures in the two-dimensional panorama picture is the default spatial position relationship, to improve the encoding flexibility. This is also a manner of improving the encoding efficiency. Further, the process may include determining whether the spatial position relationship between the sub-pictures in the two-dimensional panorama picture in the applicable spatial layout format is the same as the default spatial position relationship in the applicable spatial layout format when the applicable spatial layout format of the two-dimensional panorama picture is different from the default spatial layout format.

Based on the encoding method according to the first aspect of the present disclosure, it is considered that during actual use, if a used spatial position relationship between the sub-pictures in the two-dimensional panorama picture is not totally the same as that in a default setting, the used spatial position relationship may be partially the same as that in the default setting. For example, a default arrangement order of the sub-pictures is: left→front→right→top→rear→bottom. However, an actually used order is bottom→rear→left→front→right→top. An arrangement order of only the last four sub-pictures is the same as that in the default setting. For this case, actually, starting from the third sub-space in the applicable spatial layout format, it is unnecessary to determine an arrangement order of sub-pictures corresponding to other subsequent subspaces, but only needs to notify the decoder side that starting from a position, the default arrangement order of the sub-pictures is still used, and notify the decoder side of a length of the subspaces that use the same arrangement order. Correspondingly, the encoding method may include, when the spatial position relationship between the sub-pictures in the two-dimensional panorama picture in the applicable spatial layout format is different from the default spatial position relationship in the applicable spatial layout format, determining whether the spatial position relationship between the sub-pictures in the two-dimensional panorama picture in the applicable spatial layout format is partially the same as the default spatial position relationship in the applicable spatial layout format, and if the spatial position relationship is partially the same as the default spatial position relationship, encoding, in an encoding manner of using the default spatial position relationship, sub-pictures within a particular range starting from a currently-processed sub-picture. This processing manner is particularly applicable to a case in which the spatial layout format of the two-dimensional panorama picture includes a plurality of subspaces, for example, 12 or 20 subspaces, and corresponding sub-pictures in the two-dimensional panorama picture include a corresponding quantity of sub-pictures. Certainly, the encoding method may further include, for example, determining a range of sub-pictures in the two-dimensional panorama picture that have a same spatial position relationship as the default spatial position relationship, for example, encoding the fourth to the eleventh sub-pictures in an encoding manner of using the same default spatial position relationship.

In the encoding method according to the first aspect of the present disclosure and various extended solutions, the spatial position relationship between the sub-pictures in the panorama picture includes an arrangement order of the sub-pictures in the panorama picture, rotation angles of the sub-pictures in the panorama picture, or an arrangement order and rotation angles of the sub-pictures in the panorama picture.

According to a second aspect of the present disclosure, a decoding method is provided. The decoding method includes receiving an encoded bitstream of a two-dimensional panorama picture, and determining an applicable spatial layout format of the two-dimensional panorama picture, parsing the encoded bitstream of the two-dimensional panorama picture, to determine whether a spatial position relationship between sub-pictures in the two-dimensional panorama picture in the applicable spatial layout format is a default spatial position relationship, and decoding the encoded bitstream of the two-dimensional panorama picture based on the applicable spatial layout format and the default spatial position relationship if the spatial position relationship between the sub-pictures in the two-dimensional panorama picture in the applicable spatial layout format is the default spatial position relationship.

In the decoding method, the default spatial position relationship between the sub-pictures in the two-dimensional panorama picture in the applicable spatial format of the two-dimensional panorama picture is introduced. Usually, the spatial position relationship between the sub-pictures in the two-dimensional panorama picture is relatively fixed. Therefore, compared with decoding a spatial position relationship between sub-pictures in the two-dimensional panorama picture one by one, this manner of using the default spatial position relationship requires only one piece of indication information to be decoded to obtain the spatial position relationship between the sub-pictures in the two-dimensional panorama picture such that decoding complexity is reduced, a decoding time is reduced, and requirements on buffer space in a decoding process are reduced.

Based on the decoding method according to the second aspect of the present disclosure, considering coding flexibility and overheads of coding code words, the step of determining an applicable spatial layout format of a to-be-encoded two-dimensional panorama picture may be implemented through derivation, and may include obtaining a width and a height of the two-dimensional panorama picture, and determining the applicable spatial layout format of the two-dimensional panorama picture based on an aspect ratio of the two-dimensional panorama picture and a preset correspondence table between an aspect ratio and a spatial layout format. The step of determining an applicable spatial layout format of a to-be-encoded two-dimensional panorama picture may be implemented through derivation, or may be directly obtained by parsing the bitstream. Further, the step may include parsing the encoded bitstream of the two-dimensional panorama picture, to obtain an index of the applicable spatial layout format of the two-dimensional panorama picture, and determining the applicable spatial layout format of the two-dimensional panorama picture based on the index of the spatial layout format.

Based on the decoding method according to the second aspect of the present disclosure, considering flexibility of this solution, there may be more than one default spatial position relationship, that is, there may be a plurality of default spatial position relationships to be used by the sub-pictures of the two-dimensional panorama picture. Correspondingly, the decoding method further includes, if the spatial position relationship between the sub-pictures in the two-dimensional panorama picture in the applicable spatial layout format is a default spatial position relationship, parsing the encoded bitstream of the two-dimensional panorama picture to obtain an index of the default spatial position relationship, obtaining, from the plurality of default spatial position relationships based on the index of the default spatial position relationship, the default spatial position relationship that corresponds to the index and that is of the sub-pictures in the two-dimensional panorama picture, and decoding the encoded bitstream of the two-dimensional panorama picture based on the applicable spatial layout format and the default spatial position relationship.

Based on the decoding method according to the second aspect of the present disclosure, considering simplicity of the decoding solution, it may alternatively be considered to introduce a default spatial layout format of the two-dimensional panorama picture. Correspondingly, the decoding method includes parsing the encoded bitstream of the two-dimensional panorama picture, to determine whether the applicable spatial layout format of the two-dimensional panorama picture is a default spatial layout format, and correspondingly, the step of determining whether a spatial position relationship between the sub-pictures in the two-dimensional panorama picture in the applicable spatial layout format is a default spatial position relationship in the applicable spatial layout format also needs to be adaptively changed. Further, the step is changed to determining, depending on whether the applicable spatial layout format of the two-dimensional panorama picture is the default spatial layout format, that the spatial position relationship between the sub-pictures in the two-dimensional panorama picture is the default spatial position relationship when the applicable spatial layout format of the two-dimensional panorama picture is the default spatial layout format. In addition, complexity on a decoder side is considered, that is, when the spatial layout format of the two-dimensional panorama picture is not the default spatial layout format, a spatial position relationship between sub-pictures in the two-dimensional panorama picture does not need to be decoded one by one, and instead, it is determined whether the spatial position relationship between the sub-pictures in the two-dimensional panorama picture is the default spatial position relationship, to determine whether to decode the sub-pictures using a default position relationship, to reduce decoding complexity and overheads of decoding hardware. Further, this solution may be when the applicable spatial layout format of the two-dimensional panorama picture is not the default spatial layout format, determining whether the spatial position relationship between the sub-pictures in the two-dimensional panorama picture in the applicable spatial layout format is the default spatial position relationship, and if the spatial position relationship between the sub-pictures in the two-dimensional panorama picture is the default spatial position relationship, decoding the encoded bitstream of the two-dimensional panorama picture based on the applicable spatial layout format and the default spatial position relationship.

Based on the decoding method according to the second aspect of the present disclosure, it is considered that during actual use, if a used spatial position relationship between the sub-pictures in the two-dimensional panorama picture is not totally the same as that in a default setting, the used spatial position relationship may be partially the same as that in the default setting. For example, a default arrangement order of the sub-pictures is: left→front→right→top→rear→bottom. However, an actually used order is bottom→rear→left→front→right→top. An arrangement order of only the last four sub-pictures is the same as that in the default setting. For this case, actually, starting from the third subspace in the applicable spatial layout format, it is unnecessary to determine an arrangement order of sub-pictures corresponding to other subsequent subspaces, but only needs to notify the decoder side that starting from a position, the default arrangement order of the sub-pictures is still used, and notify the decoder side of a length of the subspaces that use the same arrangement order. Correspondingly, the decoding method may include, when it is determined by parsing the bitstream that the spatial position relationship between the sub-pictures in the two-dimensional panorama picture in the applicable spatial layout format is different from the default spatial position relationship in the applicable spatial layout format, parsing the bitstream, determining whether the spatial position relationship between the sub-pictures in the two-dimensional panorama picture in the applicable spatial layout format is partially the same as the default spatial position relationship in the applicable spatial layout format, and if the spatial position relationship is partially the same as the default spatial position relationship, decoding, in a decoding manner of using the default spatial position relationship, sub-pictures within a range starting from a currently-processed sub-picture. This processing manner is particularly applicable to a case in which the spatial layout format of the two-dimensional panorama picture includes a plurality of subspaces, for example, 12 or 20 subspaces, and corresponding sub-pictures in the two-dimensional panorama picture include a corresponding quantity of sub-pictures. Certainly, the decoding method may further include, for example, parsing the bitstream to determine a range of sub-pictures in the two-dimensional panorama picture that have a same spatial position relationship as the default spatial position relationship, for example, decoding the fourth to the eleventh sub-pictures in a decoding manner of using the same default spatial position relationship.

In the decoding method according to the second aspect of the present disclosure and various extended solutions, the spatial position relationship between the sub-pictures in the panorama picture includes an arrangement order of the sub-pictures in the panorama picture, rotation angles of the sub-pictures in the panorama picture, or an arrangement order and rotation angles of the sub-pictures in the panorama picture.

According to a third aspect of the present disclosure, an apparatus for implementing the encoding method according to the first aspect of the present disclosure is provided. The encoding apparatus includes a spatial layout format and spatial position relationship determining unit configured to determine an applicable spatial layout format of a to-be-encoded two-dimensional panorama picture and a spatial position relationship between sub-pictures in the two-dimensional panorama picture in the applicable spatial layout format, a judgment unit configured to determine whether the spatial position relationship between the sub-pictures in the two-dimensional panorama picture in the applicable spatial layout format is the same as a default spatial position relationship in the applicable spatial layout format, and an encoding unit configured to, when the spatial position relationship between the sub-pictures in the two-dimensional panorama picture in the applicable spatial layout format is the same as the default spatial position relationship in the applicable spatial layout format, encode indication information used to indicate that the sub-pictures in the two-dimensional panorama picture in the applicable spatial layout format use the default spatial position relationship, and encode the sub-pictures in the two-dimensional panorama picture based on the applicable spatial layout format and the default spatial position relationship to generate an encoded bitstream.

In the encoding apparatus, the default spatial position relationship between the sub-pictures in the two-dimensional panorama picture in the applicable spatial format of the two-dimensional panorama picture is introduced. Usually, the spatial position relationship between the sub-pictures in the two-dimensional panorama picture is relatively fixed. Therefore, compared with encoding a spatial position relationship between sub-pictures in the two-dimensional panorama picture one by one, this manner of using the default spatial position relationship requires only one piece of indication information to clearly describe the spatial position relationship between the sub-pictures in the two-dimensional panorama picture such that relatively high overheads of coding code words are reduced and encoding efficiency is improved.

According to a fourth aspect of the present disclosure, an apparatus for implementing the decoding method according to the second aspect of the present disclosure is provided. The decoding apparatus includes a spatial layout format determining unit configured to receive an encoded bitstream of a two-dimensional panorama picture, and determine an applicable spatial layout format of the two-dimensional panorama picture, a spatial position relationship determining unit configured to parse the bitstream, to determine whether a spatial position relationship between sub-pictures in the two-dimensional panorama picture in the applicable spatial layout format is a default spatial position relationship, and a decoding unit configured to decode the encoded bitstream of the two-dimensional panorama picture based on the applicable spatial layout format and the default spatial position relationship if the spatial position relationship between the sub-pictures in the two-dimensional panorama picture in the applicable spatial layout format is the default spatial position relationship.

In the decoding apparatus, the default spatial position relationship between the sub-pictures in the two-dimensional panorama picture in the applicable spatial format of the two-dimensional panorama picture is introduced. Usually, the spatial position relationship between the sub-pictures in the two-dimensional panorama picture is relatively fixed. Therefore, compared with decoding a spatial position relationship between sub-pictures in the two-dimensional panorama picture one by one, this manner of using the default spatial position relationship requires only one piece of indication information to be decoded to obtain the spatial position relationship between the sub-pictures in the two-dimensional panorama picture such that decoding complexity is reduced, a decoding time is reduced, and requirements on buffer space in a decoding process are reduced.

According to a fifth aspect of the present disclosure, an apparatus for implementing the encoding method according to the first aspect of the present disclosure is provided. The apparatus includes a non-volatile storage medium and a central processing unit. The non-volatile storage medium stores an executable program, and the central processing unit is connected to the non-volatile storage medium and executes the executable program to implement the encoding method according to the first aspect of the present disclosure and extended content thereof.

According to a sixth aspect of the present disclosure, an apparatus for implementing the decoding method according to the second aspect of the present disclosure is provided. The apparatus includes a non-volatile storage medium and a central processing unit. The non-volatile storage medium stores an executable program, and the central processing unit is connected to the non-volatile storage medium and executes the executable program to implement the decoding method according to the second aspect of the present disclosure and extended content thereof.

According to a seventh aspect of the present disclosure, an encoding and decoding system is provided. The system includes the encoding apparatus according to the third aspect of the present disclosure and the decoding apparatus according to the fourth aspect of the present disclosure. The decoding apparatus is configured to decode an encoded bitstream from the encoding apparatus.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following descriptions show merely some embodiments of the present disclosure, and persons of ordinary skill in the art may still derive other drawings from these accompanying drawings without creative efforts.

FIG. 7A and FIG. 7B are schematic diagrams of comparison between different spatial layout formats of a two-dimensional panorama picture;

FIG. 8 is a schematic diagram of position marking of subspaces in a hexahedral spatial layout format;

FIG. 10 shows an example of an encoding process of a two-dimensional panorama picture in a hexahedral spatial layout format;

DESCRIPTION OF EMBODIMENTS

Technical solutions in embodiments of the present disclosure are clearly described below with reference to the accompanying drawings using a panorama encoding technology applied to a VR scenario as an example. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
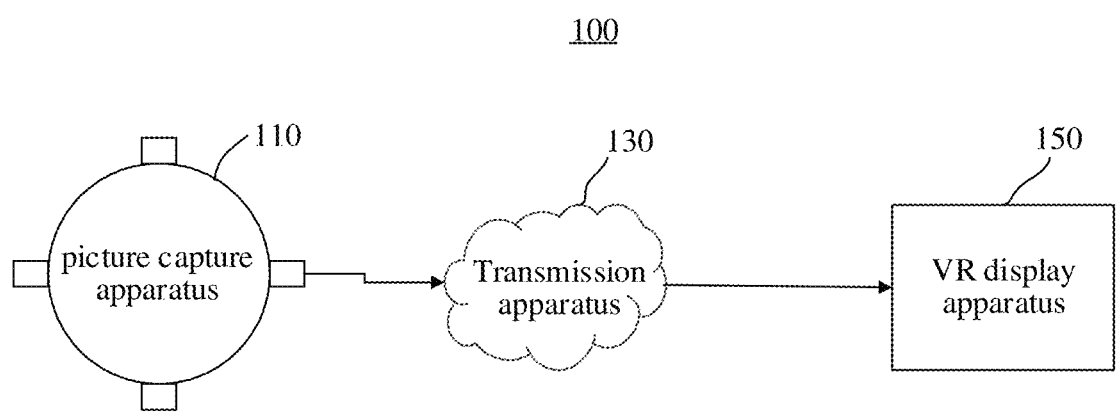
FIG. 1 is a diagram of a system framework of a VR device applying an embodiment of the present disclosure.

FIG. 1 is a diagram of a system framework of a VR device 100 applying an embodiment of the present disclosure. The VR device 100 has a picture capture apparatus 110 connected to a VR display apparatus 150 using a transmission apparatus 130. The transmission apparatus 130 may include a local area network (LAN), a wireless LAN (WLAN), Internet, a long term evolution (LTE) network, and the like.

Figure 2:
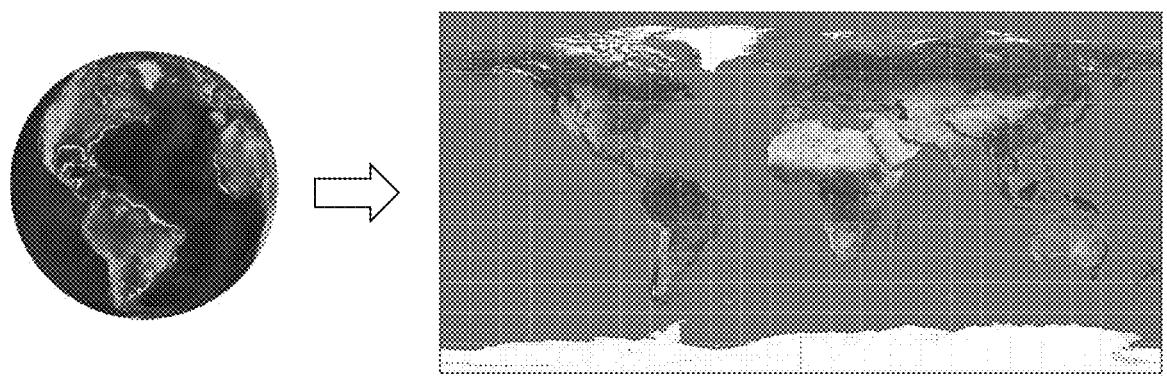
FIG. 2 is a geographic map of a panorama picture.

The picture capture apparatus 110 includes N cameras. The N cameras are arranged in a region in which a panorama picture needs to be generated, and are configured to obtain pictures of viewpoints respectively corresponding to the N cameras. The pictures of the viewpoints are spliced into a spherical panorama having omnidirectional visual information at 360 degrees in top, bottom, left, and right directions in a three-dimensional space. The spherical panorama may be understood as a picture in a spherical format that approximately centers on the picture capture apparatus 110. However, the picture in the spherical format cannot be easily indicated, stored, and indexed. Therefore, in other approaches, the spherical panorama is usually expanded to obtain a two-dimensional planar panorama, and then operations such as compression, processing, storage, and transmission are performed on the two-dimensional planar panorama. An operation of expanding a three-dimensional spherical panorama into a two-dimensional planar panorama is referred to as mapping. At present, there is a plurality of mapping methods, and correspondingly, a plurality of two-dimensional planar panorama formats is obtained. A most common panorama format is referred to as a geographic map. As shown in FIG. 2, in the geographic map, pictures of regions adjacent to the north and south poles obtained through stretching are severely distorted and have data redundancy.

Figure 3A:
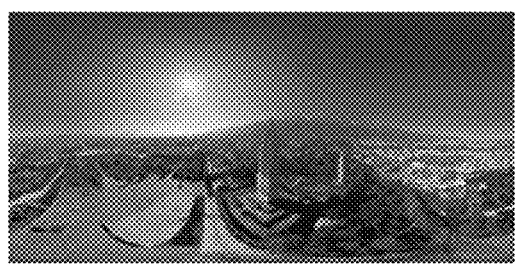
FIG. 3A, FIG. 3B, FIG. 3C, and FIG. 3D are two-dimensional panoramic views in a polyhedral format.
Figure 3B:
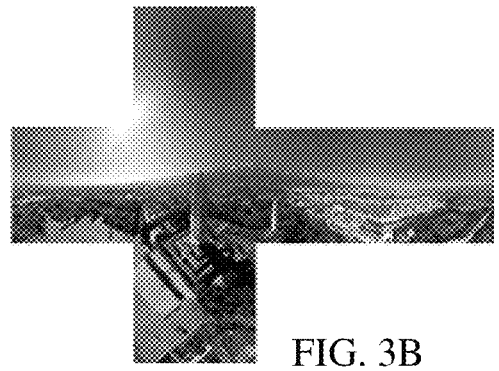
Figure 3C:
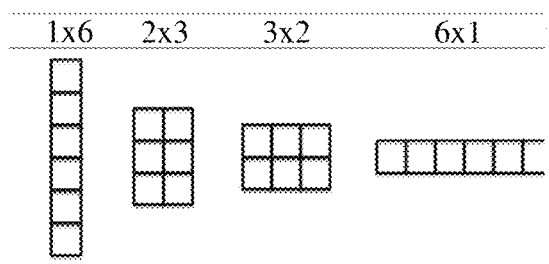
Figure 3D:
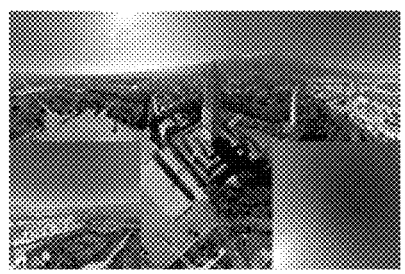

To overcome the disadvantages existing in the geographic map, as shown in FIG. 3A, content of the spherical panorama may be mapped onto a polyhedron, and typically, the polyhedron may be a cube (a hexahedron). Therefore, the spherical panorama is indicated by a plurality of panorama pictures using a plurality of faces of the polyhedron. Using a cube as an example, the spherical panorama is indicated using six equally-sized quadrate faces of a plurality of cubes. After picture snapped on the six faces of the cube are directly expanded according to a spatial neighboring relationship, a two-dimensional cross-shaped picture may be obtained, as shown in FIG. 3B. The picture in such a format may also be referred to as a two-dimensional picture in a hexahedral format. During picture processing such as compression, the cross-shaped picture shown in FIG. 3B may be directly processed. Alternatively, a rectangular region that has a smallest area and that encircles the cross-shaped picture may be selected as a processing object. If the rectangular region still has redundancy after accommodating all content of the cross-shaped picture, that is, the cross-shaped picture cannot exactly cover an entire space of the rectangular region, a redundant part in the rectangular region may be filled with default content, for example, filled as all black or all white, or a pixel value in the cross-shaped picture is used for padding. To reduce an area of the two-dimensional picture in the hexahedral format, the six faces of the hexahedron may be disassembled, that is, the cross-shaped picture is disassembled and then re-arranged, that is, the six faces are combined into a rectangular region based on given geometric positions such as 1×6, 2×3, 3×2, or 6×1, as shown in FIG. 3C. The geometric position herein is referred to as a spatial layout format. FIG. 3D is a hexahedral spatial layout format in 3×2 arrangement.

Figure 4:
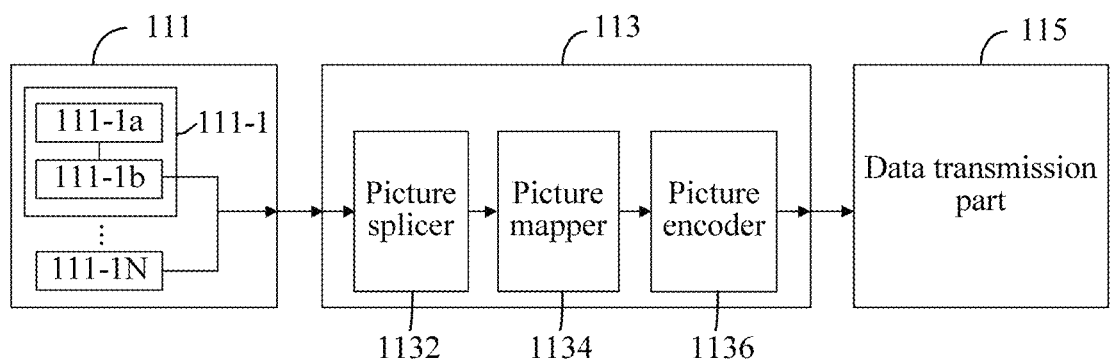
FIG. 4 is a schematic diagram of a view picture capture apparatus applying an embodiment of the present disclosure.

After the three-dimensional spherical panorama is mapped into a two-dimensional planar panorama picture using the foregoing various mapping methods or other mapping methods not listed in this specification, the picture capture apparatus 110 performs further picture encoding (compression and post-processing) on the panorama picture and transmits the panorama picture to the VR display apparatus 150 using the transmission apparatus 130. It should be noted that some related parameter information of the N cameras 111-1 to 111-N, as shown in FIG. 4, that needs to be used during mapping of the foregoing picture from the three-dimensional spherical panorama to the two-dimensional planar panorama also needs to be transmitted to the VR display apparatus 150 using the transmission apparatus 130. The related parameter information includes, but is not limited to, information such as a focal length, a picture depth, distortion, tilt angles of the cameras, distances between the cameras, and an angle covered by a viewing angle.

The VR display apparatus 150 is configured to receive compressed data, namely, an encoded panorama picture sent from the picture capture apparatus 110, decode the compressed data to reconstruct panorama picture data of the panorama picture, and display the panorama picture on a display screen of the display apparatus 150 based on the panorama picture data.

FIG. 4 is a diagram of a system framework of the picture capture apparatus 110. The picture capture apparatus 110 includes a camera part 111, including the N cameras 111-1 to 111-N, a picture processing part 113, and a data transmission part 115.

The N cameras 111-1 to 111-N of the camera part 111 are arranged in the region in which the panorama picture needs to be generated to obtain sub-pictures required for obtaining the panorama picture through splicing. The sub-pictures are relative to the panorama picture, and the panorama picture is a spherical panorama having picture information at 360 degrees in top, bottom, left, and right directions in a three-dimensional space. The camera 111-1 has an imager 111-1a and a signal processor 111-1b. The imaging apparatus 111-1a includes an imaging lens assembly and a picture sensing apparatus (not shown). The imaging lens assembly is a prime or a zoom light adjustment apparatus including one or more groups of coaxial lens. The picture sensing apparatus may include a charge-coupled device (CCD), a complementary metal oxide semiconductor (CMOS), or the like. The signal processor 111-1b performs sampling, gain controlling, analog-signal-to-digital-signal conversion, white balance adjustment, and gamma correction on an analog picture signal that is output from the imager 111-1a to generate a digital picture.

The picture processing part 113 includes a picture splicer 1132, a picture mapper 1134, and a picture encoder 1136.

The picture splicer 1132 slices N digital pictures from the N cameras 111-1 to 111-N of the camera part 111. The splicing process may be simply understood as determining a spatial position relationship of the N digital pictures based on a spatial position relationship of the N cameras, then performing feature matching on neighboring digital pictures, and performing correction and coordinate alignment on the neighboring digital pictures based on a result of the feature matching, to slice the N digital pictures into a three-dimensional panorama picture.

The picture mapper 1134 is configured to map the three-dimensional panorama picture generated by the picture splicer into a two-dimensional panorama picture. A mapping process of the three-dimensional panorama picture is as described above. The two-dimensional panorama picture obtained after mapping may be in a geographic map format or a polyhedral format, and the polyhedral format such as a hexahedral format can ensure relatively small distortion of the picture.

The picture encoder 1136 is configured to encode the two-dimensional panorama picture generated through mapping performed by the picture mapper 1134, and output the two-dimensional panorama picture to the data transmission part. The picture encoder 1136 may perform operations according to a video compression standard (for example, the HEVC H.265 standard), and may comply with an HEVC Test Model (HM). Text description ITU-TH.265 (V3) (April 2015) of the H.265 standard is released on Apr. 29, 2015, and may be downloaded from http://handle.itu.int/11.1002/1000/12455. The file is incorporated in this specification by reference in its entirety. Alternatively, the picture encoder 1136 may perform operations according to other dedicated or industrial standards. The standards include ITU-TH.261, International Organization for Standardization (ISO)/International Electrotechnical Commission (IEC)MPEG-1Visual, ITU-TH.262, ISO/IECMPEG-2Visual, ITU-TH.263, ISO/IECMPEG-4Visual, or ITU-TH.264 (also referred to as ISO/IECMPEG-4AVC), and include Scalable Video Coding (SVC) extension and Multiview Video Coding (MVC) extension. It should be understood that the technology in the present disclosure is not limited to any particular encoding and decoding standard or technology.

The picture encoder 1136 may be implemented using a plurality of processing circuits, for example, one or more microprocessors, a digital signal processor (DSP), an application-specific integrated circuit (ASCI), a field programmable gate array (FPGA), discrete logic, hardware, or any combination thereof. If the technology is partially or entirely implemented using software, the apparatus may store an instruction of the software in a suitable non-transitory computer-readable storage medium, and may execute the technology in the present disclosure using one or more processors by executing the instruction in the hardware. Any one of the foregoing (including hardware, software, a combination of hardware and software, and the like) may be considered as the one or more processors.

The picture encoder 1136 encodes the two-dimensional panorama picture. A plurality of frames of two-dimensional panorama pictures that are temporally consecutive form a panoramic video. The panoramic video is encoded by the picture encoder 1136 to form a panoramic video bitstream. The bitstream includes, in a form of a bitstream, encoding information of panoramic video data. The encoding information may include encoded picture data and associated data. The associated data may include a sequence parameter set (SPS), a picture parameter set (PPS), and another syntactic structure. The SPS may include a parameter applied to none or a plurality of sequences. The PPS may include a parameter applied to zero or a plurality of pictures. The syntactic structure refers to a set of zero or a plurality of syntactic elements arranged in the bitstream in a specified order.

In an encoding process, the picture encoder 1136 may partition a to-be-encoded picture into grids of code tree blocks (CTBs). In some examples, the CTB may be referred to as a "tree block", a "largest coding unit" (LCU), or a "coding tree unit". The CTB is not limited to a particular size and may include one or more coding units (CUs). Each CTB may be associated with an equally-sized pixel block in the picture. Each pixel may correspond to one luminance (luminance or luma) sample and two chrominance (chrominance or chroma) samples. Therefore, each CTB may be associated with one luminance sample block and two chrominance sample blocks. The CTBs of the picture may be divided into one or more slices. In some examples, each slice includes an integral quantity of CTBs. As a part of picture encoding, the picture encoder 1136 may generate encoding information of each slice of the picture, that is, encode a CTB in the slice. To encode the CTB, the picture encoder 1136 may recursively perform quadtree partitioning on a pixel block associated with the CTB to partition the pixel block into pixel blocks of increasingly smaller sizes. The smaller pixel block may be associated with the CU.

Figure 5:
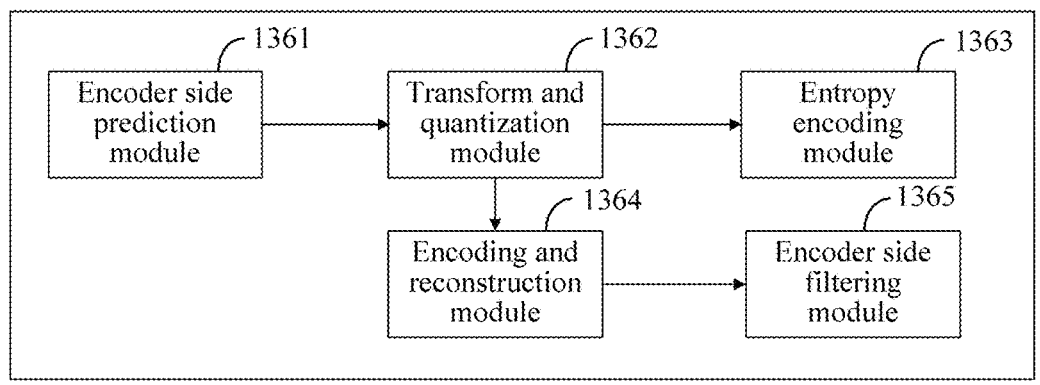
FIG. 5 is a schematic diagram of a picture encoder applying an embodiment of the present disclosure.

FIG. 5 is a schematic block diagram of a picture encoder 1136 according to an embodiment of the present disclosure. The picture encoder 1136 includes an encoder side prediction module 1361, a transform and quantization module 1362, an entropy encoding module 1363, an encoding and reconstruction module 1364, and an encoder side filtering module 1365.

The encoder side prediction module 1361 is configured to generate predictive data. The encoder side prediction module 1361 may generate one or more predicting units (PUs) of each CU that will not be further split. PUs of the CU may be associated with different sub-pixel-blocks in a pixel block of the CU. The encoder side prediction module 1361 may generate a predictive pixel block for each PU of the CU. The encoder side prediction module 1361 may generate the predictive pixel block for the PU through intra-frame prediction or inter-frame prediction. If generating the predictive pixel block for the PU through intra-frame prediction, the encoder side prediction module 1361 may generate the predictive pixel block for the PU based on pixels, of a picture associated with the PU, obtained after decoding. If generating the predictive pixel block for the PU through inter-frame prediction, the encoder side prediction module 1361 may generate the predictive pixel block for the PU based on pixels, of one or more pictures different from the picture associated with the PU, obtained after decoding. The encoder side prediction module 1361 may generate a residual pixel block for the CU based on the predictive pixel block for the PU of the CU. The residual pixel block for the CU may indicate a difference between a sample value in the predictive pixel block for the PU of the CU and a corresponding sample value in an initial pixel block of the CU.

The transform and quantization module 1362 is configured to process residual data obtained through prediction. The picture encoder 1136 may perform recursive quadtree partitioning on the residual pixel block for the CU to partition the residual pixel block for the CU into one or more smaller residual pixel blocks associated with a transform unit (TU) of the CU. Pixels in a pixel block associated with the TU each correspond to one luminance sample and two chrominance samples. Therefore, each TU may be associated with one luminance residual sample block and two chrominance residual sample blocks. The picture encoder 1136 may apply one or more transforms to a residual sample block associated with the TU to generate a coefficient block (that is, a block of a coefficient). The transform may be a DCT transform or a variant thereof. A two-dimensional transform is calculated using a DCT transform matrix and by applying a one-dimensional transform in horizontal and vertical directions, to obtain the coefficient block. The picture encoder 1136 may perform a quantization procedure on each coefficient in the coefficient block. Quantization usually refers to a process in which a coefficient is quantized to reduce a data volume used to indicate the coefficient, for further compression.

The picture encoder 1136 may generate a set of syntactic elements indicating a coefficient in the quantized coefficient block. The picture encoder 1136 may apply, using the entropy encoding module 1363, an entropy encoding operation (for example, a context-adaptive binary arithmetic coding (CABAC) operation) to some or all of the foregoing syntactic elements. To apply CABAC encoding to the syntactic elements, the entropy encoding module 1363 may binarize the syntactic elements to form a binary sequence including one or more bits (referred to as "binary bits"). The entropy encoding module 1363 may encode some of the binary bits through regular encoding, and may encode the remaining binary bits through bypass encoding.

In addition to performing entropy encoding on the syntactic elements of the coefficient block, the picture encoder 1136 may apply, using the encoding and reconstruction module 1364, inverse quantization and an inverse transform to a transformed coefficient block to reconstruct a residual sample block using the transformed coefficient block. The picture encoder 1136 may add the reconstructed residual sample block to a sample block corresponding to one or more predictive sample blocks, to generate a reconstructed sample block. The picture encoder 1136 may reconstruct, by reconstructing a sample block of each color component, the pixel block associated with the TU. A pixel block of each TU of the CU is reconstructed in such a manner until an entire pixel block of the CU is reconstructed.

After the picture encoder 1136 reconstructs the pixel block of the CU, the picture encoder 1136 performs a deblocking filtering operation using the encoder side filtering module 1365, to reduce a blocking effect of the pixel block associated with the CU. After performing the deblocking filtering operation, the picture encoder 1136 may modify the reconstructed pixel block of the CTB of the picture using a sample adaptive offset (SAO). After performing such operations, the picture encoder 1136 may store the reconstructed pixel block of the CU in a decoded picture buffer to generate a predictive pixel block for another CU.

After the picture encoder 1136 encodes the two-dimensional panorama picture generated through mapping performed by the picture mapper 1134, the data transmission part 115 is responsible for transmitting encoded data and a bitstream to the VR display apparatus 150 using the transmission apparatus 130. The data transmission part 115 may be a radio interface circuit. The radio interface circuit is connected to a controller and is suitable for generating, for example, a wireless communication signal used to communicate with a cellular communications network, a wireless communications system, or a WLAN. The wireless communication signal is sent to other apparatuses using an antenna connected to the radio interface circuit.

Figure 6:
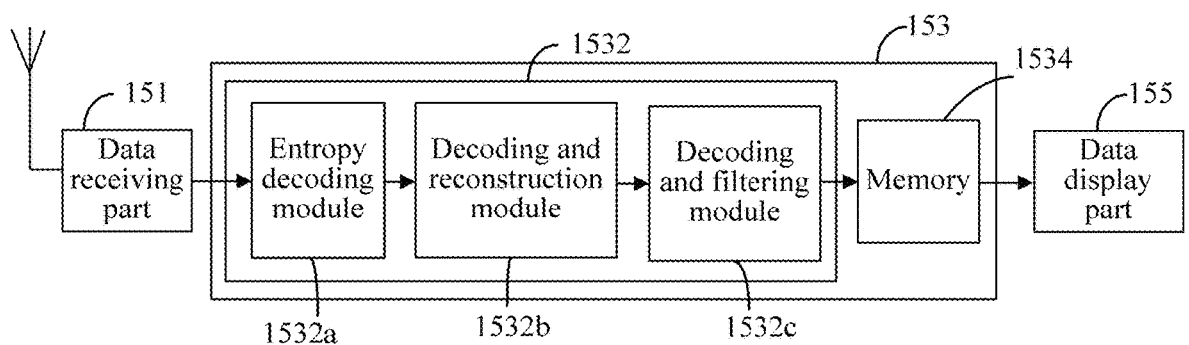
FIG. 6 is a schematic diagram of a VR display apparatus applying an embodiment of the present disclosure.

The VR display apparatus 150 is usually a head-mounted viewing device, and is usually a pair of glasses. A light emitting screen built in the VR display apparatus 150 is used for displaying a video picture. A location and direction sensing system is provided in the device, and can trace various motions of a user head and display video picture content of a corresponding location and direction on a screen. Therefore, as shown in FIG. 6, the VR display apparatus 150 includes at least a data receiving part 151, a data processing part 153, and a data display part 155. Certainly, the VR display apparatus 150 may further include an advanced interaction function module such as a user line-of-sight tracing system, and display a region of interest to a user on the screen.

The data receiving part 151 is configured to receive the data and the bitstream that are transmitted by the picture capture apparatus 110 using the transmission apparatus 130, and transmit the data received by the data receiving part 151 to the data processing part 153. The data receiving part 151 may include an antenna and a radio interface circuit. The antenna is configured to receive an apparatus sent by another data sending apparatus through communication with the cellular communications network, the wireless communications system, or the WLAN, and transmit the apparatus to the radio interface circuit. The radio interface circuit sends the apparatus to the data processing part 153.

The data processing part 153 includes at least a picture decoder 1532 and a memory 1534. The decoder 1532 is configured to decode a bitstream from the data receiving part 151. The bitstream includes, in a form of a bitstream, the encoding information of video data encoded by the picture encoder 1136. The memory 1534 is configured to store a to-be-displayed picture obtained after decoding.

The picture decoder 1532 includes an entropy decoding module 1532a, a decoding and reconstruction module 1532b, and a decoding and filtering module 1532c.

The entropy decoding module 1532a parses the bitstream to extract asyntactic element from the bitstream. When performing CABAC decoding, the picture decoder 1532 may perform regular decoding on some binary bits and may perform bypass decoding on the remaining binary bits. Binary bits in the bitstream have a mapping relationship with the syntactic element, and the syntactic element is obtained by parsing the binary bits.

The decoding and reconstruction module 1532b may reconstruct a picture of the video data based on the syntactic element extracted from the bitstream. A process of reconstructing the video data based on the syntactic element is basically inverse to a process of generating the syntactic element performed by the picture encoder 1136. For example, the picture decoder 1532 may generate a predictive pixel block fora PU of a CU based on a syntactic element associated with the CU. In addition, the picture decoder 1532 may perform inverse quantization on a coefficient block associated with a TU of the CU. The picture decoder 1532 may perform an inverse transform on the inversely-quantized coefficient, to reconstruct a residual pixel block associated with the TU of the CU. The picture decoder 1532 may reconstruct a pixel block of the CU based on the predictive pixel block and the residual pixel block.

After the decoding and reconstruction module 1532b reconstructs the pixel block of the CU, the decoding and filtering module 1532c performs a deblocking filtering operation, to reduce a blocking effect of the pixel block associated with the CU. In addition, the picture decoder 1532 may perform, based on one or more SAO syntactic elements, a same SAO operation as that performed by the picture encoder 1136. After performing such operations, the picture decoder 1532 may store the pixel block of the CU in the decoded picture buffer, that is, in the memory 1534. The decoded picture buffer may provide a reference picture used for subsequent motion compensation, intra-frame prediction, and presentation by the display apparatus.

The display part 155 is configured to read the picture obtained after decoding that is stored in the memory 1534, and display the picture using a display screen. The display screen may be a liquid crystal display (LCD), plasma, a plasma display panel, a plasma display panel, Thin-film transistor (TFT) display, an organic light-emitting diode (OLED) display, a surface-conduction electron-emitter display (SED), a laser video display, a carbon nanotube display, a quantum dot display, or an interferometric modulator display (IMOD).

In the foregoing process of performing encoding by the picture capture apparatus 110 and performing decoding by the VR display apparatus 150, a process of encoding or decoding a picture through prediction is very important. The process is one of core technologies in the entire encoding and decoding process. For a video signal, neighboring pixels in a picture have a relatively strong spatial correlation, and neighboring pictures have a very strong temporal correlation. The spatial correlation and the temporal correlation can be eliminated using the prediction technology to greatly improve encoding and decoding efficiency.

For example, when the encoder side prediction module 1361 of the picture capture apparatus 110 performs predictive coding on a to-be-encoded picture block in the two-dimensional panorama picture generated through mapping performed by the picture mapper 1134, a predictor of the to-be-encoded picture block is generated through reconstruction of a pixel at a neighboring position near the picture block. Closer predictive information to a pixel of the to-be-encoded picture block indicates a closer obtained predictor to a pixel value of the to-be-encoded picture block, a smaller residual, and a smaller corresponding encoding bit rate. Therefore, a correlation between a value of the reconstructed pixel near the to-be-encoded picture block and the pixel value of the to-be-encoded picture block directly affects encoding efficiency. For inter-frame encoding, during motion estimation, if pictures mapped on faces of a polyhedron are not ideally connected, the encoding efficiency is also affected if a boundary (a boundary between neighboring pictures) is crossed in a motion estimation process.

Using the foregoing two-dimensional panorama picture in the hexahedral format as an example, there are six sub-pictures in total forming the two-dimensional panorama picture. Usually, the six sub-pictures have four spatial layout formats, that is, the spatial layout formats shown in FIG. 3C. For any spatial layout format, the six sub-pictures may be arranged in any order, and the sub-pictures may further rotate at an angle. However, in order to maintain a spatial correlation between the sub-pictures as much as possible to improve efficiency of predictive coding, an arrangement order of the sub-pictures may be set based on a specific case. For example, in a same 3×2 layout format, for FIG. 7A and FIG. 7B, faces in FIG. 7B are more naturally connected, and a spatial correlation between the faces is relatively desirably maintained. However, for FIG. 7A, because a pixel jump at a position in which the faces are connected is relatively large, a relatively desirable spatial correlation cannot be maintained, and the encoding efficiency is affected. Therefore, in order to improve the encoding efficiency, information about a layout format of the sub-pictures in the two-dimensional panorama picture and an arrangement order of the sub-pictures is very important, and the information reflecting the layout format of the sub-pictures and the arrangement order of the sub-pictures is encoded in a particular manner in an encoding process and transmitted to a decoder side.

Figure 9:
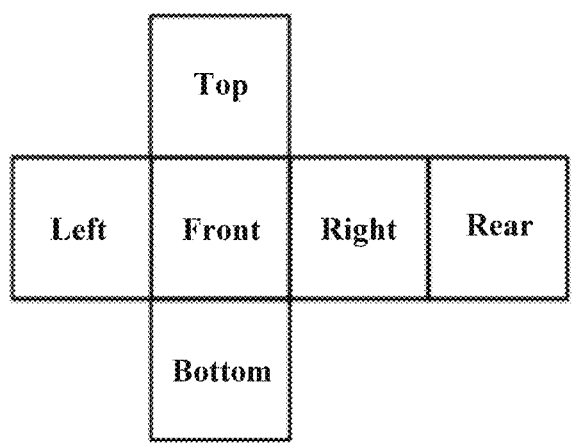
FIG. 9 is a schematic diagram of naming of sub-pictures in a two-dimensional panorama picture.

Still using the foregoing two-dimensional panorama picture in the hexahedral format as an example, the six sub-pictures in the two-dimensional panorama picture in the hexahedral format usually have four types (Type_idx: 0 to 3) of spatial layout formats. To indicate an arrangement order of the sub-pictures in the two-dimensional panorama picture in the hexahedral format in a spatial layout format, first, different spatial layout formats need to be divided into subspaces whose size is similar with or the same as that of the sub-pictures in the two-dimensional panorama picture in the hexahedral format, and the subspaces obtained through division are numbered in a preset order, for example, 0 to 5. The process may also be understood as correspondingly indexing spatial positions in a spatial layout format, and correspondingly, 0 to 5 are index values of the different positions, as shown in FIG. 8 below. It should be noted that positions herein may alternatively be marked in another marking form. For example, for a 1×6 spatial layout format, positions may be marked from bottom to top or in another marking form. Correspondingly, to distinguish and identify sub-pictures in the three-dimensional panorama picture in the hexahedral format, after the three-dimensional panorama picture in the hexahedral format is expanded to the cross-shaped two-dimensional panorama picture in the hexahedral format, the six sub-pictures may be respectively named as left, front, right, rear, top, and bottom in a manner shown in FIG. 9.

Identifiers of the foregoing six sub-pictures may be defined using an array FaceArray={left, front, right, rear, top, bottom}. Elements in FaceArray are sequentially placed into subspaces in a spatial layout format in an arrangement order, for example, {left→0, front→1, right→2, rear→3, top→4, bottom→5} such that a two-dimensional panorama picture in the particular arrangement order in the particular spatial layout format, also referred to as a rearranged two-dimensional panorama picture, can be obtained.

On a premise of the foregoing definition, to improve the encoding efficiency of the two-dimensional panorama picture in the hexahedral format, the sub-pictures in the two-dimensional panorama picture in the hexahedral format maybe arranged in any order, to improve a spatial correlation between the sub-pictures in the two-dimensional panorama picture in the hexahedral format as much as possible. Therefore, such a free arrangement order needs to be supported in an encoding/decoding syntax design. An example of the syntax design is shown in the following Table 1:

TABLE 1

```
layout_mapping_extension( ) {
        num_of_layout_face_minus1
        for ( i=0; i<num_of_layout_face_minus1; i++) {
            layout_face[i]
            layout_rotation[i]
        }
        layout_rotation[num_of_layout_face_minus1]
}
``` num_of_layout_face_minus1: Where a value of num_of_layout_face_minus1 plus 1 is a number of faces of a polyhedron, and herein is a number of faces of a hexahedron.

layout_face[i]: Which describes indication information of a sub-picture placed in a subspace at an $i^{th}$ position in a current layout format. It should be noted that an index value of only a current face in the remaining faces in the FaceArray array needs to be identified herein, and indication information of only previous five faces needs to be identified (where the remaining last face is placed in a subspace at the last position).

layout_rotation[i]: Which describes a rotation angle of the sub-picture in the subspace at the $i^{th}$ position. A correspondence between rotation angle indication information and an actual rotation angle may be shown in Table 2 below. During actual use, another correspondence may alternatively be used, provided that the other correspondence is agreed upon by both an encoder side and the decoder side.

TABLE 2

| layout_rotation[i] | rotation degree (counterclockwise) |
| --- | --- |
| 0 | 0 |
| 1 | −90 |
| 2 | +90 |
| 3 | +180 |

Further, an encoding example based on syntax in Table above is shown in FIG. 10. A quantity of elements in FaceArray continuously decreases, but a relative order of remaining sub-pictures remains unchanged.

However, although this syntax structure can implement a free arrangement order and free rotation angles of the sub-pictures corresponding to different spatial formats, actually, for a common panorama picture, because relative positions between the sub-pictures are determined, a method for arranging and rotating the sub-pictures in a spatial layout format to maintain the spatial correlation between the sub-pictures as much as possible is also determined. Therefore, in a particular spatial layout format, there is no need to encode the arrangement order and the rotation angles of the sub-pictures each time, resulting in low encoding efficiency of encoding the arrangement order of the sub-pictures in the panorama picture using a current technology.

Figure 11:
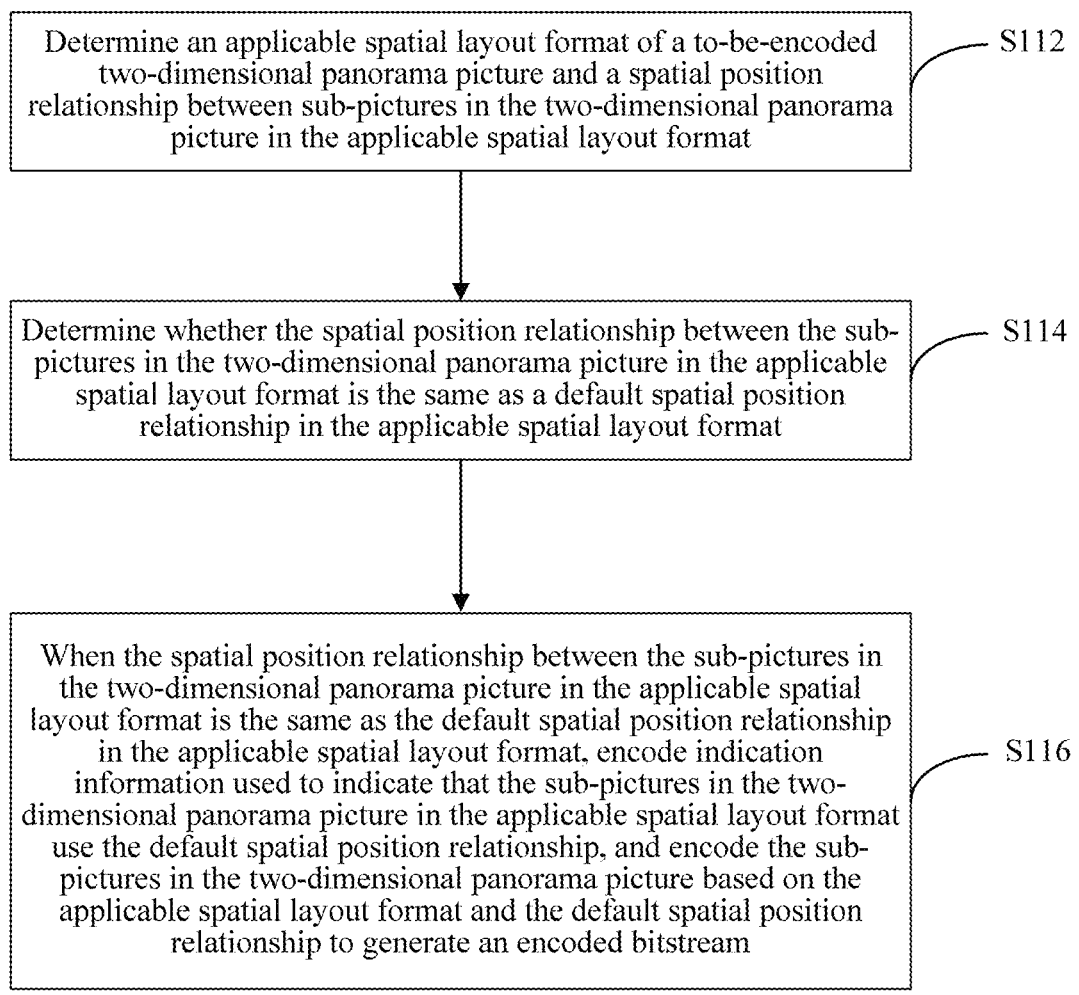
FIG. 11 is a flow block diagram of an encoding method according to an embodiment of the present disclosure.

In view of this, the present disclosure provides an encoding method, to improve encoding and decoding efficiency. As shown in FIG. 11, the encoding method 110 mainly includes the following steps.

Step S112: Determine an applicable spatial layout format of a to-be-encoded two-dimensional panorama picture and a spatial position relationship between sub-pictures in the two-dimensional panorama picture in the applicable spatial layout format.

The foregoing determining process may be implemented using a manner such as rate-distortion optimization or predictive analysis. Further, the determining process is described still using the foregoing two-dimensional panorama picture in the hexahedral format as an example. It should be noted that the "applicable" usually refers to an optimal spatial layout format of the two-dimensional panorama picture and an optimal spatial position relationship between the sub-pictures in the two-dimensional panorama picture in the optimal spatial layout format. However, in some special cases, considering encoding complexity, a latency, or encoding and decoding capabilities of an encoder and a decoder, the selected spatial layout format and the corresponding spatial position relationship may not be optimal, but best satisfy encoding and decoding requirements. This case is also allowed in the present disclosure.

Step 1: Determine a specific spatial layout format in four spatial layout formats after learning that spatial layout format in four spatial layout formats. In the determining process, the spatial layout format may be determined using an aspect ratio of the two-dimensional panorama picture. For example, vertical_size: horizontal_size=1:6 → 1×6 layout format;
vertical_size: horizontal_size=2:3 → 2×3 layout format;
vertical_size: horizontal_size=3:2 → 3×2 layout format; and
vertical_size: horizontal_size=6:1 → 6×1 layout format.

A height/width ratio of a face of the hexahedron is a greatest common divisor of vertical_size and horizontal_size.

A hexahedral spatial layout format corresponding to one of 0 to 3 in Type_idx in FIG. 8 may be obtained in this way.

Step 2: Determine the spatial position relationship between the sub-pictures in the two-dimensional panorama picture in the hexahedron format after determining the spatial layout format.

num_of_layout_face_minus1 is parsed to obtain a quantity of the sub-pictures in the panorama picture in the hexahedral format. Indication information of the sub-pictures, namely, layout_face[i] and layout_rotation[i], is sequentially parsed based on a spatial position relationship such as an arrangement order between subspaces in the spatial layout format, and indication information obtained through parsing is mapped to the sub-pictures (left, front, right, rear, top, and bottom). An encoder side and a decoder side agree upon a method for mapping indication information of sub-pictures to the sub-pictures, and determine a specific rotation angle based on rotation angle indication information obtained through parsing. The encoder side and the decoder side agree upon a method for mapping indication information to a rotation angle.

Step S114: Determine whether the spatial position relationship between the sub-pictures in the two-dimensional panorama picture in the applicable spatial layout format is the same as a default spatial position relationship in the applicable spatial layout format.

A default setting herein means that the encoder side and the decoder side together comply with an agreement. If the decoder side has known that setting of some parameters is the default setting, the decoder side does not need to parse specific syntactic element information, but directly sets, based on the agreement, the parameters to parameters corresponding to the default setting. The spatial position relationship may refer to a spatial arrangement order of the sub-pictures, rotation angles of the sub-pictures, or a spatial arrangement order and rotation angles. Using a 3×2 layout format in FIG. 8 as an example, the sub-pictures in the two-dimensional panorama picture are usually arranged in an order of left, front, right, top, rear, and bottom, and respectively rotate at rotation angles of 0, 0, 0, −90°, 90°, and −90°. A correlation between the sub-pictures can be desirably maintained. Therefore, a spatial position relationship between the sub-pictures in such a specified spatial layout format may be set as the default setting. During specific encoding, if an actually-used arrangement order of the sub-pictures and/or actually-used rotation angle information are/is the same as that in the default setting, the encoder side, for example, the picture encoder 1136 in the picture capture apparatus 110, does not need to encode the arrangement order of the sub-pictures and the rotation angles of the sub-pictures. The decoder side, for example, the picture decoder 1532 in the VR display apparatus 150 may directly set, when learning that a currently used parameter is in the default setting, corresponding parameters such as the arrangement order and/or the rotation angles of the sub-pictures to a parameter corresponding to the default setting.

It should be noted that the foregoing is merely described using the default settings of the arrangement order of the sub-pictures and/or the rotation angles of the sub-pictures in the 3×2 spatial layout format as an example. During actual application, based on a similar concept, the foregoing default setting may further be similarly applied to some or all of parameters such as the spatial layout format, the arrangement order of the sub-pictures, the rotation angles of the sub-pictures, and a quantity of subspaces in a polyhedral format. In addition, in the foregoing descriptions, for ease of understanding, four common spatial layout formats corresponding to Type_idx=0 to 3 in FIG. 8 are provided. The spatial layout format may also have different changes and extensions in different application scenarios based on technological development, or may be limited to including only some of the listed spatial layout formats, for example, the 3×2 spatial layout format. This is not limited herein.

Step S116: When the spatial position relationship between the sub-pictures in the two-dimensional panorama picture in the applicable spatial layout format is the same as the default spatial position relationship in the applicable spatial layout format, encode indication information used to indicate that the sub-pictures in the two-dimensional panorama picture in the applicable spatial layout format use the default spatial position relationship, and encode the sub-pictures in the two-dimensional panorama picture based on the applicable spatial layout format and the default spatial position relationship to generate an encoded bitstream.

Considering an actual case, to reduce a quantity of coding bits of header information and to eliminate design redundancy of syntactic elements, the concept of the arrangement order of the sub-pictures and/or the rotation angles of the sub-pictures in the default setting is mainly introduced in the present disclosure. Only when the actually-used arrangement order of the sub-pictures and/or rotation angles of the sub-pictures are/is different from that in the default setting, information such as the actually-used arrangement order of the sub-pictures and/or rotation angles of the sub-pictures is further encoded. In the present disclosure according to the foregoing method, a quantity of bits required for indicating spatial position information of the sub-pictures in the two-dimensional panorama picture can be effectively reduced, thereby improving the encoding efficiency. Certainly, in correspondence with step S114, when the spatial position relationship between the sub-pictures in the two-dimensional panorama picture in the applicable spatial layout format is different from the default spatial position relationship in the applicable spatial layout format, the applicable spatial layout format of the two-dimensional panorama picture and the spatial position relationship between the sub-pictures in the two-dimensional panorama picture in the applicable spatial layout format are encoded.

Figure 12:
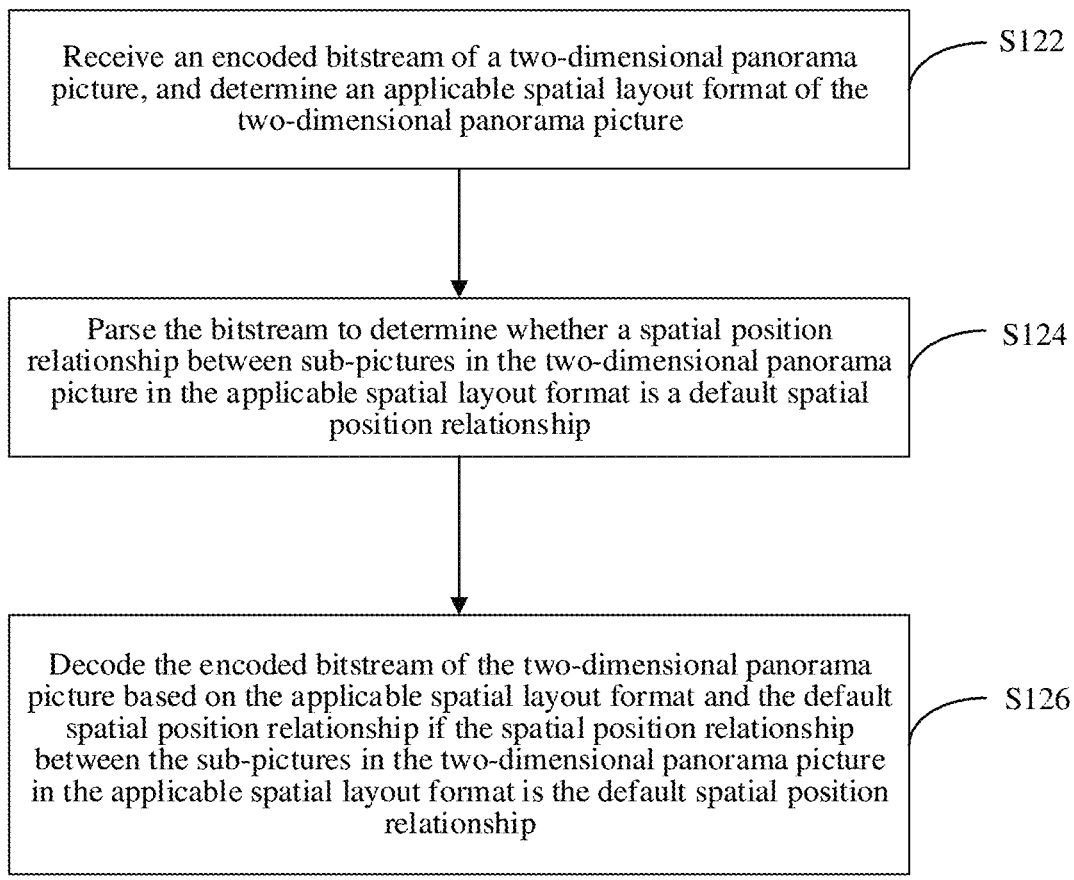
FIG. 12 is a flow block diagram of a decoding method according to an embodiment of the present disclosure.

Based on the foregoing encoding method, the present disclosure further provides a decoding method. As shown in FIG. 12, the decoding method mainly includes the following steps.

Step S122: Receive an encoded bitstream of a two-dimensional panorama picture, and determine an applicable spatial layout format of the two-dimensional panorama picture.

Step S124: Parse the bitstream to determine whether a spatial position relationship between sub-pictures in the two-dimensional panorama picture in the applicable spatial layout format is a default spatial position relationship.

Step S126: Decode the encoded bitstream of the two-dimensional panorama picture based on the applicable spatial layout format and the default spatial position relationship if the spatial position relationship between the sub-pictures in the two-dimensional panorama picture in the applicable spatial layout format is the default spatial position relationship.

In the decoding method in the present disclosure, the bitstream is decoded using the applicable spatial layout format and the default spatial position relationship such that a time and buffer space that are required in a decoding process can be effectively reduced, thereby improving decoding efficiency.

Several examples of embodiments of the present disclosure are described below using the two-dimensional panorama picture in the hexahedral format as an example. However, as described above, the present disclosure is not limited to being implemented using the hexahedral format. Other polyhedral formats having any quantity of faces, for example, a tetrahedron, a pentahedron, an octahedron, a dodecahedron, or an icosahedron may alternatively be used in the present disclosure. In addition, it should be noted that encoding information generated in the following embodiments may be set at positions such as sequence-level header information, picture-level header information, and supplemental enhancement information (SEI) in the encoded bitstream.

Embodiment 1

In this embodiment, a spatial layout format of a two-dimensional panorama picture in a hexahedral format is derived using an aspect ratio. A spatial position relationship between sub-pictures in the two-dimensional panorama picture, for example, an arrangement order, and whether the sub-pictures rotate, are obtained through rate-distortion optimization or predictive analysis. In addition, a default spatial position relationship between the sub-pictures in the two-dimensional panorama picture is set on an encoder side, for example, the picture encoder 1136 in the picture obtaining and capture apparatus 110. During setting of the default spatial position relationship between the sub-pictures in the two-dimensional panorama picture, for a two-dimensional panorama picture in a known format, a quantity of sub-pictures in the two-dimensional panorama picture is already fixed. Therefore, a syntactic element does not need to be additionally designed to indicate the quantity. Certainly, during specific design, to be applicable to various different application scenarios, the syntactic element may alternatively be designed to indicate a quantity of sub-pictures in the two-dimensional panorama picture in a format. In addition, it may be specified in advance on the encoder side and a decoder side that when specific rotation angles of the sub-pictures in the two-dimensional panorama picture are not indicated, it may be considered by default that all the sub-pictures in the two-dimensional panorama picture do not rotate, or the encoder side and the decoder side both rotate the sub-pictures in a same manner. In this way, a variable of rotation information of the sub-pictures may be omitted in a bitstream. Table 3 shows a syntactic element design in Embodiment 1 of the present disclosure.

TABLE 3

```
Cubic_layout_mapping_extension( ) {
    default_order_flag
    if(!default_order_flag){
        for ( i=0; i<5; i++) {
            layout_face[i]
        }
    }
}
``` default_order_flag describes whether a default spatial position relationship is used.

layout_face[i] describes indication information of a sub-picture placed in a subspace at an $i^{th}$ position in a current layout format. It should be noted that in a subsequent embodiment, a same syntactic element may be considered as the same as the content described in this embodiment unless otherwise indicated. For brevity, descriptions are not repeated.

In Embodiment 1, a specific embodiment process performed using an encoder such as the picture encoder 1136 in the picture obtaining and capture apparatus 110 may be as follows.

Step 1: Select an applicable spatial layout format and a spatial position relationship between sub-pictures.

An optimal spatial layout format and a corresponding optimal spatial position relationship between the sub-pictures in the two-dimensional panorama picture are selected through an operation such as rate-distortion optimization or pre-analysis. The optimal spatial position relationship includes, but is not limited to, an arrangement order and/or whether the sub-pictures rotate.

Step 2: Encode default_order_flag.

In a particular spatial layout format, because the spatial layout format is already determined, a width and a height of the picture already can be determined. Therefore, usually, a particular spatial position relationship between the sub-pictures may be optimal, that is, a most precise prediction result can be obtained. Such a particular spatial layout format and the corresponding spatial position relationship between the sub-pictures may be set on the encoder side and the decoder side as a default setting, that is, a default spatial layout format and a corresponding spatial position relationship between the sub-pictures. In the step, it needs to be first determined whether a currently-applicable spatial position relationship between the sub-pictures in a current spatial layout format is the same as a spatial position relationship between the sub-pictures in the same spatial layout format in the default setting. If the currently-applicable spatial position relationship is totally the same as the spatial position relationship in the default setting, default_order_flag is set to 1. If the currently-applicable spatial position relationship is not totally the same as the spatial position relationship in the default setting, default_order_flag is set to 0. At last, default_order_flag is encoded.

Step 3: Determine, based on default_order_flag, whether to encode layout_face[i].

If default_order_flag is 1, encoding of the spatial position relationship between the sub-pictures, for example, the arrangement order layout_face[i], is skipped. Otherwise, layout_face[i] is encoded. A specific encoding method includes, but is not limited to, entropy encoding, variable-length coding, fixed-length coding, or another encoding method, and is applicable to encoding of a syntactic element in a subsequent embodiment.

In Embodiment 1, a specific embodiment process performed using a decoder such as the picture decoder 1532 in the VR display apparatus 150 may be parsing default_order_flag, and determining, based on default_order_flag, whether to parse layout_face[i].

The syntactic element default_order_flag is parsed. If default_order_flag is 1, it indicates that the spatial layout format of the two-dimensional panorama picture and the corresponding spatial position relationship use the default setting. Therefore, syntactic elements related to the spatial layout format of the sub-pictures and the spatial position relationship corresponding to the spatial layout format in Table 3 do not need to be decoded, that is, the related syntactic elements do not need to be decoded. The spatial position relationship may be an arrangement order used by the sub-pictures in the two-dimensional panorama picture in a spatial layout format. If the default setting is used, the subsequent syntactic element layout_face[i] related to the arrangement order does not need to be parsed, and instead, the arrangement order of the sub-pictures is directly set as a default order, and decoding is performed in the default order. If default_order_flag is 0, it indicates that the spatial layout format of the two-dimensional panorama picture and the corresponding spatial position relationship do not use the default setting, and the decoder needs to further parse layout_face[i], that is, decode related syntactic elements.

Certainly, if the spatial layout format of the two-dimensional panorama picture is not set as the default setting and spatial position relationships between the sub-pictures in the two-dimensional panorama picture in various spatial layout formats are set as the default setting, before performing the foregoing step, the decoder needs to obtain the spatial layout format of the two-dimensional panorama picture. An obtaining manner may be obtaining the spatial layout format of the two-dimensional panorama picture based on an aspect ratio of the two-dimensional panorama picture. A specific obtaining manner may be obtaining a height and a width of the current two-dimensional panorama picture, calculating an aspect ratio, and determining the specific spatial layout format based on the aspect ratio. For example, an aspect ratio of 1:6 corresponds to a 1×6 layout format, an aspect ratio of 3:2 corresponds to a 3×2 layout format. Other cases can be deduced by analogy.

Embodiment 2

In this embodiment, a spatial layout format of a two-dimensional panorama picture is not deduced using an aspect ratio but is obtained by encoding specific layout format indication information. For a plurality of different layout formats, usually, a particular spatial position relationship between sub-pictures may be optimal, that is, a most precise prediction result can be obtained. Such a particular spatial layout format and the corresponding spatial position relationship between the sub-pictures may be set as a default setting on an encoder side and a decoder side. The spatial position relationship includes, but is not limited to, an arrangement order of the sub-pictures in the two-dimensional panorama picture. Table 4 is a syntactic element table corresponding to Embodiment 2 of the present disclosure.

TABLE 4

Cubic_layout_mapping_extension( ) {
   layout_type_index
   default_order_flag
  if(!default_order_flag){
    for ( i=0; i<5; i++){
     layout_face[i]
    }
  }
} layout_type_index describes an index of the spatial layout format of the current two-dimensional panorama picture, and the specific spatial layout format may be obtained based on the index.

In Embodiment 2, a specific embodiment process performed using an encoder such as the picture encoder 1136 in the picture obtaining and capture apparatus 110 may be as follows.

Step 1: Select an applicable spatial layout format and a spatial position relationship between sub-pictures.

Step 2: Encode layout_type_index.

In the step, indication information, that is, layout_type_index, that corresponds to the applicable spatial layout format is encoded.

Step 3: Encode default_order_flag.

The step is the same as step 2 in Embodiment 1, and therefore, a specific embodiment process may be learned of by referring to step 2 in Embodiment 1.

Step 4: Determine, based on default_order_flag, whether to encode layout_face[i].

If default_order_flag is 1, encoding of the spatial position relationship between the sub-pictures, for example, the arrangement orderlayout_face[i], is skipped. Otherwise, layout_face[i] is encoded.

In Embodiment 2, a specific embodiment process performed using a decoder such as the picture decoder 1532 in the VR display apparatus 150 may be as follows.

Step 1: Parse layout_type_index, to obtain aspatial layout format.

The syntactic element layout_type_index is parsed, and the specific spatial layout format is obtained based on data obtained through parsing, that is, an index value of the spatial layout format. A specific mapping manner is agreed upon by both the encoder side and a decoder side, and the corresponding spatial layout format is set as a current format actually used. Further, the corresponding spatial layout format may be obtained through table lookup based on the index value of the layout format.

Step 2: Parse default_order_flag, and determine, based on default_order_flag, whether to parse layout_face[i].

The syntactic element default_order_flag is parsed. If default_order_flag is 1, it indicates that a spatial position relationship between the sub-pictures in the two-dimensional panorama picture in a determined spatial layout format uses the default setting. Therefore, asyntactic element related to the spatial position relationship between the sub-pictures in Table 3 does not need to be decoded, that is, the related syntactic element do not need to be decoded. The spatial position relationship may be an arrangement order used by the sub-pictures in the two-dimensional panorama picture in the determined spatial layout format. If the default setting is used, the subsequent syntactic element layout_face[i] related to the arrangement order does not need to be parsed, and instead, the arrangement order of the sub-pictures is directly set as a default order, and a bitstream is decoded based on the default order. If default_order_flag is 0, it indicates that a spatial position relationship between the sub-pictures in the two-dimensional panorama picture in a determined spatial layout format does not use the default setting, and the decoder needs to further parse layout_face[i], that is, decode a related syntactic element.

Embodiment 3

In this embodiment, an optimal spatial layout format of a two-dimensional panorama picture and optimal spatial position information of sub-pictures in the two-dimensional panorama picture in the optimal spatial layout format are set as a default setting. Table 5 shows a syntactic element design corresponding to Embodiment 3 of the present disclosure.

TABLE 5

Cubic_layout_mapping_extension( ) {
   default_layout_order_flag
  if(!default_layout_order _flag){
    layout_type_index
    for ( i=0; i<5; i++) {
     layout_face[i]
    }
  }
} default_layout_order_flag describes whether the current two-dimensional panorama picture uses a default spatial layout format and a default spatial position relationship.

In Embodiment 3, a specific embodiment process performed using an encoder such as the picture encoder 1136 in the picture obtaining and capture apparatus 110 may be as follows.

Step 1: Select an applicable spatial layout format and a spatial position relationship between sub-pictures.

Step 2: Encode default_layout_order_flag.

It is determined whether the currently applicable spatial layout format and the spatial position relationship between the sub-pictures, for example, an arrangement order, are the same as those in the default setting. If the currently applicable spatial layout format and the spatial position relationship are the same as those in the default setting, default_layout_order_flag is 1, otherwise, default_layout_order_flag is 0. At last, default_layout_order_flag is encoded.

Step 3: Determine, based on default_layout_order_flag, whether to encode layout_type_index and layout_face[i].

If default_layout_order_flag is set to 1, encoding of subsequent layout_type_index and layout_face[i] is skipped. Otherwise, subsequent layout_type_index and layout_face[i] are encoded.

In Embodiment 3, a specific embodiment process performed using a decoder such as the picture decoder 1532 in the VR display apparatus 150 may be as follows.

Step 1: Parse default_layout_order_flag.

Step 2: Determine, based on default_layout_order_flag, whether to parse layout_type_index and layout_face[i].

If default_layout_order_flag is 1, it indicates that the spatial layout format of the two-dimensional panorama picture and the corresponding spatial position relationship use the default setting, and layout_type_index and layout_face[i] do not need to be further parsed. If default_layout_order_flag is 0, it indicates that the spatial layout format of the two-dimensional panorama picture and the corresponding spatial position relationship do not use the default setting, the syntactic elements layout_type_index and layout_face[i] need to be further parsed, and a bitstream is decoded based on data obtained through parsing.

Embodiment 4

To improve encoding flexibility, a default spatial layout format of a two-dimensional panorama picture and a default spatial position relationship between sub-pictures in the two-dimensional panorama picture may be separately set. A specific syntactic element design is shown in Table 6.

TABLE 6

```
Cubic_layout_mapping_extension( ) {
    default_layout_order_flag
    if(!default_layout_order _flag){
        layout_type_index
        default_order_flag
        if(!default_order_flag){
            for ( i=0; i<5; i++) {
                layout_face[i]
            }
        }
    }
}
```

In Embodiment 4, a specific embodiment process performed using an encoder such as the picture encoder 1136 in the picture obtaining and capture apparatus 110 may be as follows.

Step 1: Select an applicable spatial layout format and a corresponding applicable spatial position relationship between sub-pictures.

Step 2: Encode default_layout_order_flag.

It is determined whether the currently applicable spatial layout format and the spatial position relationship between the sub-pictures are the same as those in a default setting. If the currently applicable spatial layout format and the spatial position relationship are the same as those in the default setting, default_layout_order_flag is 1. Otherwise, default_layout_order_flag is 0. At last, default_layout_order_flag is encoded. It should be noted that if default_layout_order_flag is 1, a subsequent step of encoding syntactic elements layout_type_index, default_order_flag, and layout_face[i] is skipped. Otherwise, a subsequent step of encoding syntactic elements layout_type_index, default_order_flag, and layout_face[i] needs to be performed.

Step 3: Encode layout_type_index.

Execution of the step depends on step 2. If default_layout_order_flag is 0, this step is performed. Otherwise, this step is skipped.

Step 4: Encode default_order_flag.

It is determined whether the applicable spatial position relationship, for example, an arrangement order, of the two-dimensional panorama picture in the current spatial layout format is the same as the default spatial position relationship. If the applicable spatial position relationship is the same as the default spatial position relationship, default_order_flag is 1. Otherwise, default_order_flag is 0. At last, default_order_flag is encoded.

Step 5: Determine, based on default_order_flag, whether to encode layout_face[i].

If default_order_flag is set to 1, encoding of the arrangement orderlayout_face[i] of the sub-pictures is skipped. Otherwise, layout_face[i] is encoded.

In Embodiment 4, a specific embodiment process performed using a decoder such as the picture decoder 1532 in the VR display apparatus 150 may be as follows.

Step 1: Parse default_layout_order_flag.

First, default_layout_order_flag is parsed. If default_layout_order_flag is 1, the two-dimensional panorama picture actually uses the default spatial layout format, the spatial position relationship between the sub-pictures in the two-dimensional panorama picture also uses the default setting, and a subsequent step of parsing layout_type_index, default_order_flag, and layout_face[i] is skipped. Otherwise, a subsequent step of parsing layout_type_index, default_order_flag, and layout_face[i] is performed.

Step 2: Parse layout_type_index.

Step 3: Parse default_order_flag, and determine, based on default_order_flag, whether to parse layout_face[i].

The syntactic element default_order_flag is parsed. If default_order_flag is 1, it indicates that the spatial position relationship between the sub-pictures in the two-dimensional panorama picture in the current spatial layout format uses the default setting, that is, the spatial position relationship between the sub-pictures is the same as that in the default setting. Therefore, the subsequent syntactic element such as layout_face[i] of the spatial position relationship between the sub-pictures does not need to be parsed, and instead, the spatial position relationship between the sub-pictures is directly set as the default spatial position relationship, and an encoder side and a decoder side agree upon the default spatial position relationship. If default_order_flag is 0, it indicates that the spatial position relationship between the sub-pictures in the current spatial layout format is actually different from that in the default setting, layout_face[i] needs to be further parsed, and a bitstream is parsed based on a specific parsing result.

Embodiment 5

When a number of faces of a polyhedron during mapping of a three-dimensional panorama picture needs to be described in an encoding process, and spatial position information of sub-pictures in a two-dimensional panorama picture obtained through mapping in a particular spatial layout format is defined as including an arrangement order and rotation angles, syntactic elements num_of_layout_face_minus1 and layout_rotation[i] need to be added to indicate the number of faces of the polyhedron and the rotation angles of the sub-pictures in the two-dimensional panorama picture. The foregoing Embodiment 1 to Embodiment 4 (respectively denoted as A, B, C, and D) may be each classified into four cases depending on whether the syntactic elements num_of_layout_face_minus1 and layout_rotation[i] need to be designed. A/B/C/D each has four cases. Therefore, there are 4×4=16 cases in total. The cases may be denoted as M-m, where M=A, B, C, and D, and m=0, 1, 2, and 3. Combinations of the syntactic elements, namely, the number of faces of the polyhedron and the rotation angles of the sub-pictures in the two-dimensional panorama picture may be shown in Table 7.

TABLE 7

| m | Signal_face_number | With_rotation |
|---|---|---|
| 0 | 1 | 1 |
| 1 | 1 | 0 |
| 2 | 0 | 1 |
| 3 | 0 | 0 |

In practice, a set of arrangement orders usually corresponds to a set of rotation angles. In a set of default settings, the arrangement order and the rotation angles of the sub-pictures in the two-dimensional panorama picture may be simultaneously designed. Using D-0 as an example, that is, based on Embodiment 4, a number of faces of a hexahedron is specified, and the sub-pictures in the two-dimensional panorama picture may rotate. A specific rotation manner may be a manner in Table 2 above or another manner agreed upon by both an encoder side and a decoder side. In this way, a syntactic element design corresponding to Embodiment 5 of the present disclosure may be shown in Table 8.

TABLE 8

```
Cubic_layout_mapping_extension( ) {
        num_of_layout_face_minus1
        default_layout_order_rotation_flag
    if(!default_layout_order_rotation_flag){
        layout_type_index
        default_order_rotation_flag
    if(!default_order_rotation_flag){
        for ( i=0; i< num_of_layout_face_minus1; i++) {
            layout_face[i]
            layout_rotation[i]
        }
    layout_rotation[num_of_layout_face_minus1]
        }
    }
}
``` default_layout_order_rotation_flag describes whether the spatial layout format of the two-dimensional panorama picture and the arrangement order and the rotation angles of the sub-pictures in the two-dimensional panorama picture are the same as those in a default setting.

default_order_rotation_flag describes whether the arrangement order and the rotation angles of the sub-pictures in the two-dimensional panorama picture are the same as that in the default setting.

In Embodiment 5, a specific embodiment process performed using an encoder such as the picture encoder 1136 in the picture obtaining and capture apparatus 110 may be as follows.

Step 1: Select an applicable spatial layout format and an applicable arrangement order and applicable rotation angles of sub-pictures.

Step 2: Encode num_of_layout_face_minus1.

num_of_layout_face_minus1+1 is a number of faces of a hexahedron.

Step 3: Encode default_layout_order_rotation_flag.

It is determined whether a currently applicable spatial layout format of the two-dimensional panorama picture and an applicable arrangement order and rotation angles of a plurality of sub-pictures in the two-dimensional panorama picture are the same as those in the default setting. If the currently applicable spatial layout format and the applicable arrangement order and rotation angles of the plurality of sub-pictures are the same as those in the default setting, default_layout_order_rotation_flag is set to 1. If the currently applicable spatial layout format and the applicable arrangement order and rotation angles of the plurality of sub-pictures are different from those in the default setting, default_layout_order_rotation_flag is set to 0. At last, default_layout_order_rotation_flag is encoded. If default_layout_order_rotation_flag is 1, a subsequent step of encoding layout_type_index and layout_rotation[num_of_layout_face_minus1] may be skipped. Otherwise, a subsequent step of encoding layout_type_index and layout_rotation [num_of_layout_face_minus1] is performed.

Step 4: Encode layout_type_index.

Step 5: Encode default_order_rotation_flag.

It is determined that whether the applicable arrangement order and rotation angles of the sub-pictures in the two-dimensional panorama picture in the current spatial layout format are the same as those in the default setting. If the applicable arrangement order and rotation angles are the same as those in the default setting, default_order_rotation_flag is 1. Otherwise, default_order_rotation_flag is 0. At last, default_order_rotation_flag is encoded. If default_order_rotation_flag herein is 1, a subsequent step of encoding the syntactic elements layout_face[i] to layout_rotation[num_of_layout_face_minus1] is skipped. Otherwise, encoding of the foregoing syntactic elements, that is, the following step 6, is performed.

Step 6: Encode remaining syntactic elements layout_face [i], layout_rotation[i], and layout_rotation[num_of_layout_face_minus1].

In Embodiment 5, a specific embodiment process performed using a decoder such as the picture decoder 1532 in the VR display apparatus 150 may be as follows.

Step 1: Parse num_of_layout_face_minus1, to obtain a number of faces.

num_of_layout_face_minus1 plus 1 is a specific number of faces of a hexahedron.

Step 2: Parse default_layout_order_rotation_flag.

If default_layout_order_rotation_flag is 1, it indicates that the spatial layout format of the two-dimensional panorama picture and the arrangement order and the rotation angles that are used by the two-dimensional panorama picture are the same as those in the default setting. In this case, the decoder skips a step of parsing remaining layout_type_indextolayout_rotation[num_of_layout_face_minus1]. Otherwise, a subsequent step of parsing the syntactic elements is performed.

Step 3: Parse layout_type_index, to obtain a current spatial layout format of a two-dimensional panorama picture.

Step 4: Parse default_order_rotation_flag.

If default_order_rotation_flag is 1, it indicates that in the current spatial layout format, an arrangement order and rotation angles that are actually used by sub-pictures in the two-dimensional panorama picture are the same as those in the default setting. In this case, the decoder skips a step of parsing layout_face[i], layout_rotation[i], and layout_rotation[num_of_layout_face_minus1]. Otherwise, the decoder continues to perform a step of parsing the subsequent syntactic elements.

Step 5: Parse the syntactic elements layout_face[i], layout_rotation[i], and layout_rotation[num_of_layout_face_minus1].

Embodiment 6

During actual application, a used arrangement order of sub-pictures in a two-dimensional panorama picture is not totally the same as that in a default setting, but may be partially the same as that in the default setting. For example, a default arrangement order of the sub-pictures is left→front→right→top→rear→bottom. However, an actually used order is bottom→rear→left→front→right→top. An arrangement order of only the last four sub-pictures is the same as that in the default setting. For this case, actually, starting from the third subspace in an applicable spatial layout format, it is unnecessary to determine an arrangement order of sub-pictures corresponding to other subsequent subspaces, but only needs to notify a decoder side that starting from a position, the default arrangement order of the sub-pictures is still used, and notify the decoder side of a length of the subspaces that use the same arrangement order.

Table 9 shows a specific example of a syntax design. For ease of description, in this example, considered are only a spatial layout format of 1×6 or 6×1, and only a case in which an arrangement order of exactly four consecutive sub-pictures is the same as that in the default setting and a same order segment starts from Left.

TABLE 9

```
Cubic_layout_mapping_extension( ) {
    default_order_flag
    if(!default_order_flag){
        partial_default_order_flag
        for ( i=0; i<5; i++) {
            layout_face[i]
            if(partial_default_order_flag)&(layout_6x1||
            layout_1x6)&(i<=2)&(layout_face[i]==Left){
                i=i+(i==2?2:3)
            }
        }
    }
}
``` partial_default_order_flag describes whether an arrangement order of some of the sub-pictures in the two-dimensional panorama picture is the same as a default arrangement order.

In Embodiment 6, a specific embodiment process performed using an encoder such as the picture encoder 1136 in the picture obtaining and capture apparatus 110 may be as follows.

Step 1: Select an applicable spatial layout format and a spatial position relationship between sub-pictures.

An optimal spatial layout format and a corresponding optimal spatial position relationship between the sub-pictures in the two-dimensional panorama picture are selected through an operation such as rate-distortion optimization or pre-analysis. The optimal spatial position relationship includes, but is not limited to, an arrangement order and/or whether the sub-pictures rotate.

Step 2: Encode default_order_flag.

In a particular spatial layout format, because the spatial layout format is already determined, a width and a height of the picture already can be determined. Therefore, usually, a particular spatial position relationship between the sub-pictures may be optimal, that is, a most precise prediction result can be obtained. Such a particular spatial layout format and the corresponding spatial position relationship between the sub-pictures may be set on an encoder side and the decoder side as a default setting, that is, a default spatial layout format and a corresponding spatial position relationship between the sub-pictures. In the step, it needs to be first determined whether a currently-applicable spatial position relationship between the sub-pictures in a current spatial layout format is the same as a spatial position relationship between the sub-pictures in the same spatial layout format in the default setting. If the currently-applicable spatial position relationship is totally the same as the spatial position relationship in the default setting, default_order_flag is set to 1. If the currently-applicable spatial position relationship is not totally the same as the spatial position relationship in the default setting, default_order_flag is set to 0. At last, default_order_flag is encoded.

Step 3: Determine, based on default_order_flag, whether to encode partial_default_order_flag and layout_face[i].

If default_order_flag is 1, encoding of partial_default_order_flag and layout_face[i] is skipped. If default_order_flag is 0, it indicates that the spatial position relationship, for example, the arrangement order and/or the rotation angles, between the sub-pictures in the two-dimensional panorama picture is not totally the same as that in the default setting. However, a part of the order may be the same as that in the default setting. Therefore, a spatial position relationship between currently remaining sub-pictures is compared with a default spatial position relationship. If a part of the spatial position relationship is the same as a part of the spatial position relationship in the default setting, partial_default_order_flag is 1. Otherwise, partial_default_order_flag is 0. At last, partial_default_order_flag is encoded. An encoder side and a decoder side need to agree upon a method for determining that a part of an order is the same as that in a default setting. For example, for this embodiment, if the current spatial layout format is 1×6 or 6×1, a position of Left is located in a subspace at a position of 0, 1, or 2, and an arrangement order of exactly three consecutive faces next to Left is the same as an order of three consecutive faces next to Left in the default setting, it is considered that an arrangement order of current faces is partially the same as that in the default setting.

Step 4: Determine, based on partial_default_order_flag, a method for encoding layout_face[i].

If partial_default_order_flag is 0, layout_face[i] is sequentially encoded and no process is skipped. If partial_default_order_flag is 1 and a current subspace position is≤2, and when a face encoded at the current subspace position is Left, encoding of indication information of sub-pictures at subsequent two or three consecutive subspace positions is skipped. If a current position is 2, encoding of indication information of sub-pictures in subsequent two consecutive subspace positions is skipped because indication information of a specific face in the last subspace position does not need to be encoded. Otherwise, encoding of indication information of sub-pictures in subsequent three consecutive subspace positions is skipped.

In Embodiment 6, a specific embodiment process performed using a decoder such as the picture decoder 1532 in the VR display apparatus 150 may be as follows.

Step 1: Parse default_order_flag, and determine, based on default_order_flag, whether to parse partial_default_order_flag and layout_face[i].

The syntactic element default_order_flag is parsed. If default_order_flag is 1, it indicates that the spatial layout format of the two-dimensional panorama picture and the corresponding spatial position relationship use the default setting. Therefore, partial_default_order_flag does not need to be parsed, and syntactic elements related to the spatial layout format of the sub-pictures and the spatial position relationship corresponding to the spatial layout format in Table 3 do not need to be decoded, that is, the related syntactic elements do not need to be decoded. The spatial position relationship may be an arrangement order used by the sub-pictures in the two-dimensional panorama picture in a spatial layout format. If the default setting is used, the subsequent syntactic element layout_face[i] related to the arrangement order does not need to be parsed, and instead, the arrangement order of the sub-pictures is directly set as a default order, and decoding is performed in the default order. If default_order_flag is 0, it indicates that the spatial layout format of the two-dimensional panorama picture and the corresponding spatial position relationship do not use the default setting, and the decoder needs to further parse partial_default_order_flag and layout_face[i] and set the arrangement order of the sub-pictures based on a specific parsing result.

Certainly, if the spatial layout format of the two-dimensional panorama picture is not set as the default setting and spatial position relationships between the sub-pictures in the two-dimensional panorama picture in various spatial layout formats are set as the default setting, before performing the foregoing step, the decoder needs to obtain the spatial layout format of the two-dimensional panorama picture. An obtaining manner may be obtaining the spatial layout format of the two-dimensional panorama picture based on an aspect ratio of the two-dimensional panorama picture. A specific obtaining manner may be obtaining a height and a width of the current two-dimensional panorama picture, calculating an aspect ratio, and determining the specific spatial layout format based on the aspect ratio. For example, an aspect ratio of 1:6 corresponds to a 1×6 layout format, an aspect ratio of 3:2 corresponds to a 3×2 layout format. Other cases can be deduced by analogy.

Step 3: Parse partial_default_order_flag, and determine, based on partial_default_order_flag, a method for parsing layout_face[i].

The syntactic element partial_default_order_flag is parsed. If partial_default_order_flag is 0, subsequent layout_face[i] is sequentially parsed. If partial_default_order_flag is 1, the current spatial layout format is 1×6 or 6×1, a current subspace position is≤2, and a currently parsed sub-picture is Left, parsing of indication information of sub-pictures corresponding to subsequent two or three consecutive subspace positions is skipped. If the current position is 2, parsing of indication information of sub-pictures corresponding to subsequent two consecutive subspace positions is skipped because specific indication information of a face at the last subspace position does not need to be parsed. Otherwise, parsing of indication information of sub-pictures corresponding to subsequent three consecutive subspace positions is skipped.

It should be noted that in this embodiment, the spatial layout format is deduced using the aspect ratio by default. During actual use, a type of the used spatial layout format may alternatively be directly encoded. In this embodiment, encoding of a number of faces of a hexahedron and rotation angles of the faces are not considered. During actual use, impact of the two factors may alternatively be considered. In this embodiment, only two types of spatial layout formats (layout_6×1 and layout_1×6) are considered. During actual use, this embodiment may also be extended to another spatial layout format using a similar method. In this embodiment, the encoder side and the decoder side agree upon that a same order segment starts from Left. During actual use, the same order segment may alternatively start from a middle face. Alternatively, indication information of a starting face is directly encoded. In this embodiment, the same order segment has a length of 4, and may have a length of another quantity during actual use. Alternatively, the length of the same order segment is directly encoded. In this embodiment, it is determined that a starting subspace position i of the partially matched arrangement order is less than or equal to 2. During actual use, the starting subspace position may alternatively be set to another value. In addition, a quantity of subspace positions that are subsequently omitted may also be modified. This is also affected by the length of the same order segment.

Embodiment 7

During actual use, to improve flexibility, for a plurality of default spatial position relationships such as default arrangement orders that sub-pictures may have, for example, for a 6×1 spatial layout format, left→front→right→top→rear→bottom and rear→bottom→left→front→right→top may be both set as the default arrangement order of the sub-pictures. If an arrangement order of the sub-pictures that is selected by an encoder side is one of the default arrangement orders, in this case, in addition to indicating that a currently used arrangement order of the sub-pictures is a default setting, the encoder side further needs to notify a decoder side of a specific default arrangement order of the sub-pictures. Table 10 shows a syntactic element design in this case.

TABLE 10

```
Cubic_layout_mapping_extension( ) {
    default_order_flag
    if(default_order_flag){
        default_order_index
    }else{
        for ( i=0; i<5; i++) {
            layout_face[i]
        }
    }
}
``` default_order_index describes an index of the default spatial position relationship between the sub-pictures.

In Embodiment 7, a specific embodiment process performed using an encoder such as the picture encoder 1136 in the picture obtaining and capture apparatus 110 may be as follows.

Step 1: Select an applicable spatial layout format and a spatial position relationship between sub-pictures.

An optimal spatial layout format and a corresponding optimal spatial position relationship between the sub-pictures in the two-dimensional panorama picture are selected through an operation such as rate-distortion optimization or pre-analysis. The optimal spatial position relationship includes, but is not limited to, an arrangement order and/or whether the sub-pictures rotate.

Step 2: Encode default_order_flag.

In a particular spatial layout format, because the spatial layout format is already determined, a width and a height of the picture already can be determined. Therefore, usually, a particular spatial position relationship between the sub-pictures may be optimal, that is, a most precise prediction result can be obtained. Such a particular spatial layout format and the corresponding spatial position relationship between the sub-pictures may be set on the encoder side and the decoder side as a default setting, that is, a default spatial layout format and a spatial position relationship between the sub-pictures. In the step, it needs to be first determined whether a currently-applicable spatial position relationship between the sub-pictures in a current spatial layout format is the same as a spatial position relationship between the sub-pictures in the same spatial layout format in the default setting. If the currently-applicable spatial position relationship is totally the same as the spatial position relationship in the default setting, default_order_flag is set to 1. If the currently-applicable spatial position relationship is not totally the same as the spatial position relationship in the default setting, default_order_flag is set to 0. At last, default_order_flag is encoded.

Step 3: Determine, based on default_order_flag, whether to encode default_order_index and layout_face[i].

If default_order_flag is 1, indication information of a default arrangement order of sub-pictures that is currently used needs to be further encoded. The encoder side and the decoder side need to together determine a manner of mapping indication information to an arrangement order of a plurality of sub-pictures, and encoding of the arrangement orderlayout_face[i] of the sub-pictures is skipped. Otherwise, layout_face[i] is encoded.

In Embodiment 7, a specific embodiment process performed using a decoder such as the picture decoder 1532 in the VR display apparatus 150 may be as follows.

Step 1: Parse default_order_flag, and determine, based on default_order_flag, whether to parse default_order_index and layout_face[i].

The syntactic element default_order_flag is parsed. If default_order_flag is 1, it indicates that the spatial layout format of the two-dimensional panorama picture and the corresponding spatial position relationship use the default setting, default_order_index needs to be further parsed to obtain a default spatial position relationship between the sub-pictures that is used in the current spatial layout format, and the subsequent syntactic element layout_face[i] related to the arrangement order does not need to be parsed. The spatial position relationship may be an arrangement order used by the sub-pictures in the two-dimensional panorama picture in a spatial layout format. If the default setting is used, the subsequent syntactic element layout_face[i] related to the arrangement order does not need to be parsed, and instead the arrangement order of the sub-pictures is directly set as a default order, and decoding is performed based on the default order. If default_order_flag is 0, it indicates that the spatial layout format of the two-dimensional panorama picture and the corresponding spatial position relationship do not use the default setting, and the decoder needs to further parse layout_face[i], that is, decode the related syntactic element.

Certainly, if the spatial layout format of the two-dimensional panorama picture is not set as the default setting and spatial position relationships between the sub-pictures in the two-dimensional panorama picture in various spatial layout formats are set as the default setting, before performing the foregoing step, the decoder needs to obtain the spatial layout format of the two-dimensional panorama picture. An obtaining manner may be obtaining the spatial layout format of the two-dimensional panorama picture based on an aspect ratio of the two-dimensional panorama picture. A specific obtaining manner may be obtaining a height and a width of the current two-dimensional panorama picture, calculating an aspect ratio, and determining the specific spatial layout format based on the aspect ratio. For example, an aspect ratio of 16 corresponds to a 1×6 layout format, an aspect ratio of 3:2 corresponds to a 3×2 layout format. Other cases can be deduced by analogy.

It should be noted that in this embodiment, two syntactic elements are used to respectively indicate whether a default arrangement order (default_order_flag) of the sub-pictures is used and a specific default arrangement order (default_order_index) of the sub-pictures that is used. Actually, default_order_index may be directly used for analysis and determining. For example, when default_order_index is 0, it is considered that the default arrangement order of the sub-pictures is not used. When default_order_index is not 0, a specific default arrangement order of the sub-pictures is determined based on a specific value of default_order_index (where the encoder side and the decoder side agree upon a mapping manner), as shown in Table 11.

TABLE 11

```
Cubic_layout_mapping_extension( ) {
    default_order_index
    if(default_order_index!=0){
        for ( i=0; i<5; i++) {
            layout_face[i]
        }
    }
}
```

It should be noted that in this embodiment, the spatial layout format is deduced using the aspect ratio by default. During actual use, a type of the used spatial layout format may alternatively be directly encoded. In this embodiment, encoding of a number of faces of a hexahedron and rotation angles of the faces are not considered. During actual use, impact of the two factors may alternatively be considered. In this embodiment, a plurality of default arrangement orders of the sub-pictures is stipulated for each spatial layout format only. During actual use, this embodiment may also be used to stipulate a plurality of default spatial layout formats and a plurality of arrangement orders of the sub-pictures (when the spatial layout format is deduced using spatial layout format indication information instead of the aspect ratio for encoding). Alternatively, this embodiment is used to additionally stipulate a plurality of default arrangement orders of the sub-pictures for each spatial layout format when stipulating a plurality of default spatial layout formats and a plurality of arrangement orders of the sub-pictures. In addition, the foregoing case may also be extended in use with reference to the rotation angles.

In the present disclosure, names of the foregoing syntactic elements, a method for encoding the syntactic elements, and a logic determining process of the syntactic elements may be designed and adjusted based on different requirements, and are not limited to the forms provided in the foregoing examples.

Figure 13:
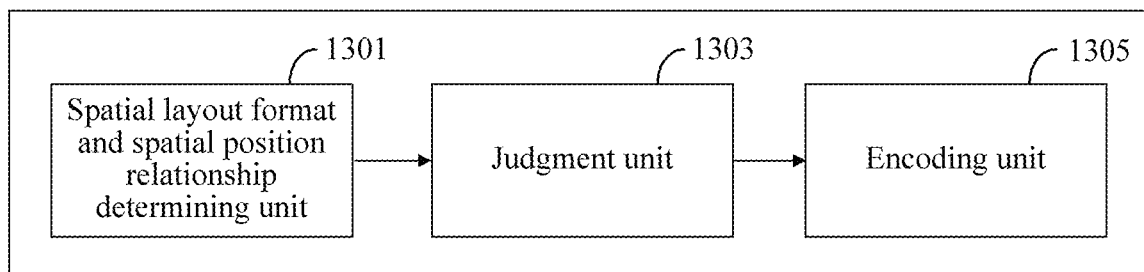
FIG. 13 is a block diagram of an encoding apparatus according to an embodiment of the present disclosure.

All the embodiments described above may be implemented in a form of hardware. For example, the encoding method 110 may be implemented using a hardware apparatus, for example, an encoding apparatus, that is in a hardware form or that has corresponding functions. FIG. 13 shows an encoding apparatus 1300 configured to implement all the possible encoding methods described above in the present disclosure. The encoding apparatus includes a spatial layout format and spatial position relationship determining unit 1301 configured to determine an applicable spatial layout format of a to-be-encoded two-dimensional panorama picture and a spatial position relationship between sub-pictures in the two-dimensional panorama picture in the applicable spatial layout format, a judgment unit 1303 configured to determine whether the spatial position relationship between the sub-pictures in the two-dimensional panorama picture in the applicable spatial layout format is the same as a default spatial position relationship in the applicable spatial layout format, and an encoding unit 1305 configured to, when the spatial position relationship between the sub-pictures in the two-dimensional panorama picture in the applicable spatial layout format is the same as the default spatial position relationship in the applicable spatial layout format, encode indication information used to indicate that the sub-pictures in the two-dimensional panorama picture in the applicable spatial layout format use the default spatial position relationship, and encode the sub-pictures in the two-dimensional panorama picture based on the applicable spatial layout format and the default spatial position relationship to generate an encoded bitstream.

In the present disclosure, according to the foregoing apparatus, a quantity of bits required for indicating spatial position information of the sub-pictures in the two-dimensional panorama picture can be effectively reduced, thereby improving encoding efficiency. The units of the encoding apparatus 1300 may be functional units, and are implemented using commodity hardware or special-purpose hardware.

Figure 14:
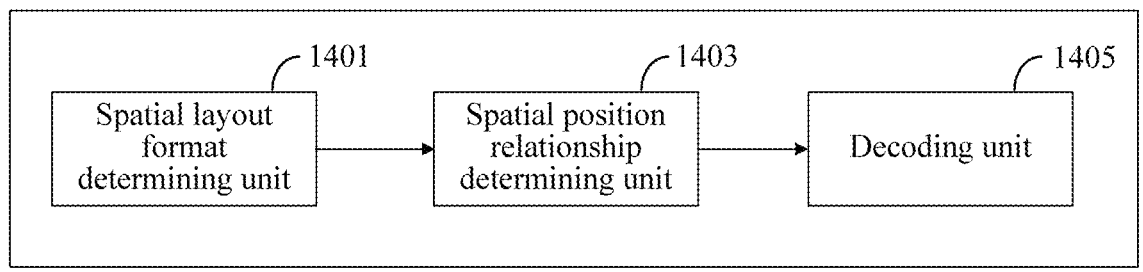
FIG. 14 is a block diagram of a decoding apparatus according to an embodiment of the present disclosure.

Similarly, a decoding method 120 may be implemented using a hardware apparatus, for example, a decoding apparatus, that is in a hardware form or that has corresponding functions. FIG. 14 shows a decoding apparatus 1400 configured to implement all the possible decoding methods described above in the present disclosure. The decoding apparatus includes a spatial layout format determining unit 1401 configured to receive an encoded bitstream of a two-dimensional panorama picture, and determine an applicable spatial layout format of the two-dimensional panorama picture, a spatial position relationship determining unit 1403 configured to parse the bitstream to determine whether a spatial position relationship between sub-pictures in the two-dimensional panorama picture in the applicable spatial layout format is a default spatial position relationship, and a decoding unit 1405 configured to decode the encoded bitstream of the two-dimensional panorama picture based on the applicable spatial layout format and the default spatial position relationship if the spatial position relationship between the sub-pictures in the two-dimensional panorama picture in the applicable spatial layout format is the default spatial position relationship.

The units of the decoding apparatus 1400 may be functional units, and are implemented using commodity hardware or special-purpose hardware.

In the decoding apparatus in the present disclosure, a bitstream is decoded using a default spatial layout format and a spatial position relationship such that a time and buffer space that are required in a decoding process can be effectively reduced, thereby improving decoding efficiency.

In one or more examples, the described functions may be implemented by hardware, software, firmware, or any combination thereof. If the functions are implemented by the software, the functions may be stored in a computer-readable medium as one or more instructions or code, or sent by a computer-readable medium and are executed by a processing unit based on the hardware. The computer-readable medium may include a computer-readable storage medium (which corresponds to a tangible medium such as a data storage medium) or a communications medium, and the communications medium includes, for example, any medium that promotes transmission of data from a place to another place using a computer program according to a communication protocol. In this way, the computer-readable medium may be generally corresponding to (1) a non-transitory tangible computer-readable storage medium, or (2) a communications medium such as a signal or a carrier. The data storage medium may be accessed by one or more computers or one or more processors to retrieve an instruction, code, and/or a data structure for implementing any available medium in the technologies described in the present disclosure. A computer program product may include a computer-readable medium.

By way of example and not limitation, some computer-readable storage media may include a random access memory (RAM), a read-only memory (ROM), an electrically erasable programmable read-only memory (EEPROM), a compact disc ROM (CD-ROM), another optical disc storage or magnetic disk storage, another magnetic storage apparatus, a flash memory, or any other medium that can store required program code in a form of an instruction or a data structure and can be accessed by a computer. In addition, any connection may be appropriately referred to as a computer-readable medium. For example, if an instruction is sent from a website, a server, or another remote source using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer-readable storage medium and the data storage medium may not include a connection, a carrier, a signal, or another transitory medium, but are non-transitory tangible storage media. A disk and an optical disc used in this specification include a compact disc (CD), a laser disc, an optical disc, a digital versatile disc (DVD), a FLOPPY DISK, and a BLU-RAY DISC. The magnetic disk generally magnetically copies data, and the optical disc optically copies data using a laser. A combination of the foregoing objects shall be further included in the scope of the computer-readable medium.

An instruction may be executed by one or more processors such as one or more DSPs, a general microprocessor, an ASIC, an FPGA, or other equivalent integrated or discrete logic circuits. Therefore, the term "processor" used in this specification may refer to the foregoing structure or any other structure applicable to implement the technologies described in this specification. In addition, in some aspects, the functions described in this specification may be provided in special-purpose hardware and/or a software module configured for encoding and decoding, or may be incorporated into a combined coder-decoder. In addition, the technologies may be completely implemented in one or more circuits or logical elements.

The technologies in the present disclosure may be widely implemented by a plurality of apparatuses or devices. The apparatuses or devices include a radio handset, an integrated circuit (IC), or an IC set (for example, a chip set). In the present disclosure, various components, modules, and units are described to emphasize functional aspects of an apparatus that is configured to implement the disclosed technologies, and the functional aspects do not necessarily need to be implemented by different hardware units. Precisely, as described above, various units may be combined into a coder-decoder hardware unit, or may be provided by a set of interoperable hardware units (including one or more processors described above) with a combination of appropriate software and/or firmware.

It should be understood that "one embodiment" or "an embodiment" mentioned in the whole specification means that particular features, structures, or characteristics related to embodiments are included in at least one embodiment of the present disclosure. Therefore, "in one embodiment" or "in an embodiment" that appears throughout the whole specification does not necessarily mean a same embodiment. Moreover, the particular features, structures, or properties may be combined into one or more embodiments in any proper manner.

It should be understood that sequence numbers of the foregoing processes do not mean execution sequences in various embodiments of the present disclosure. The execution sequences of the processes should be determined according to functions and internal logic of the processes, and should not be construed as any limitation on the embodiment processes of the embodiments of the present disclosure.

In addition, the terms "system" and "network" may be used interchangeably in this specification. It should be understood that the term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that in the embodiments provided in this application, "B corresponding to A" indicates that B is associated with A, and B may be determined according to A. However, it should further be understood that determining B according to A does not mean that B is determined according to A only, that is, B may also be determined according to A and/or other information.

Persons of ordinary skill in the art may be aware that, the units and algorithm steps in the examples described with reference to the embodiments disclosed in this specification may be implemented by electronic hardware, computer software, or a combination thereof. To clearly describe the interchangeability between the hardware and the software, compositions and steps of each example have been generally described in the foregoing description according to functions. Whether the functions are performed by hardware or software depends on particular applications and design constraint conditions of the technical solutions. Persons skilled in the art may use different methods to implement the described functions for each particular application, but it should not be considered that the embodiment goes beyond the scope of the present disclosure.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

The descriptions are only specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A decoding method, comprising:
receiving an encoded bitstream of a two-dimensional panorama picture;
determining an applicable spatial layout format of the two-dimensional panorama picture;
parsing the encoded bitstream of the two-dimensional panorama picture to determine whether a spatial position relationship among sub-pictures in the two-dimensional panorama picture in the applicable spatial layout format is a default spatial position relationship; and
decoding the encoded bitstream of the two-dimensional panorama picture based on the applicable spatial layout format and the default spatial position relationship when the spatial position relationship among the sub-pictures in the two-dimensional panorama picture in the applicable spatial layout format is the default spatial position relationship.

2. The decoding method of claim 1, wherein parsing the encoded bitstream of the two-dimensional panorama picture comprises:
parsing the encoded bitstream of the two-dimensional panorama picture to obtain a default spatial position relationship indication identifier;
determining that the spatial position relationship among the sub-pictures in the two-dimensional panorama picture in the applicable spatial layout format is the default spatial position relationship when the default spatial position relationship indication identifier is a first vale.

3. The decoding method of claim 1, wherein determining the applicable spatial layout format of the two-dimensional panorama picture comprises:
parsing the encoded bitstream of the two-dimensional panorama picture to obtain a width and a height of the two-dimensional panorama picture; and
determining the applicable spatial layout format of the two-dimensional panorama picture based on an aspect ratio of the two-dimensional panorama picture and a preset correspondence table between an aspect ratio and a spatial layout format.

4. The decoding method of claim 1, wherein the default spatial position relationship comprises a plurality of different default spatial position relationships, and when the spatial position relationship among the sub-pictures in the two-dimensional panorama picture in the applicable spatial layout format is the default spatial position relationship, decoding the encoded bitstream of the two-dimensional panorama picture comprising:

parsing the encoded bitstream of the two-dimensional panorama picture to obtain an index of the default spatial position relationship;

obtaining, from the different default spatial position relationships based on the index of the default spatial position relationship, the default spatial position relationship corresponding to the index of the sub-pictures in the two-dimensional panorama picture; and decoding the encoded bitstream of the two-dimensional panorama picture based on the applicable spatial layout format and the default spatial position relationship.

5. The decoding method of claim 1, wherein determining the applicable spatial layout format of the two-dimensional panorama picture comprises parsing the encoded bitstream of the two-dimensional panorama picture to determine whether the applicable spatial layout format of the two-dimensional panorama picture is a default spatial layout format, and determining whether the spatial position relationship among the sub-pictures in the two-dimensional panorama picture in the applicable spatial layout format is the default spatial position relationship comprising determining, that the spatial position relationship among the sub-pictures in the two-dimensional panorama picture is the default spatial position relationship when the applicable spatial layout format of the two-dimensional panorama picture is the default spatial layout format.

6. The decoding method of claim 5, wherein parsing the encoded bitstream of the two-dimensional panorama picture comprises:

parsing the encoded bitstream of the two-dimensional panorama picture to obtain a default spatial layout format indication identifier; and determining that the applicable spatial layout format of the two-dimensional panorama picture is the default spatial layout format when the default spatial layout format indication identifier is a first value.

7. The decoding method of claim 1, wherein determining the applicable spatial layout format of the two-dimensional panorama picture comprises parsing the encoded bitstream of the two-dimensional panorama picture to determine whether the applicable spatial layout format of the two-dimensional panorama picture is a default spatial layout format, and determining whether the spatial position relationship among the sub-pictures in the two-dimensional panorama picture in the applicable spatial layout format is the default spatial position relationship comprising determining whether the spatial position relationship among the sub-pictures in the two-dimensional panorama picture in the applicable spatial layout format is the default spatial position relationship when the applicable spatial layout format of the two-dimensional panorama picture is not the default spatial layout format.

8. The decoding method of claim 1, wherein the spatial position relationship among the sub-pictures in the two-dimensional panorama picture comprises:

an arrangement order of the sub-pictures in the two-dimensional panorama picture; or rotation angles of the sub-pictures in the two-dimensional panorama picture.

9. An encoding method, comprising:

determining an applicable spatial layout format of a two-dimensional panorama picture and a spatial position relationship among sub-pictures in the two-dimensional panorama picture in the applicable spatial layout format;

determining whether the spatial position relationship among the sub-pictures in the two-dimensional panorama picture in the applicable spatial layout format is the same as a default spatial position relationship in the applicable spatial layout format; and encoding indication information indicating that the sub-pictures in the two-dimensional panorama picture in the applicable spatial layout format use the default spatial position relationship, and encoding the sub-pictures in the two-dimensional panorama picture based on the applicable spatial layout format and the default spatial position relationship to generate an encoded bitstream when the spatial position relationship among the sub-pictures in the two-dimensional panorama picture in the applicable spatial layout format is the same as the default spatial position relationship in the applicable spatial layout format.

10. The encoding method of claim 9, wherein when the spatial position relationship among the sub-pictures in the two-dimensional panorama picture in the applicable spatial layout format is the same as the default spatial position relationship in the applicable spatial layout format, encoding the indication information comprises:

setting a default spatial position relationship indication identifier to a first value; and encoding the default spatial position relationship indication identifier set to the first value.

11. The encoding method of claim 9, wherein determining the applicable spatial layout format of the two-dimensional panorama picture comprises:

obtaining a width and a height of the two-dimensional panorama picture; and determining the applicable spatial layout format of the two-dimensional panorama picture based on an aspect ratio of the two-dimensional panorama picture and a preset correspondence table between an aspect ratio and a spatial layout format.

12. The encoding method of claim 11, further comprising:

obtaining an index of the applicable spatial layout format of the two-dimensional panorama picture; and encoding the index of the applicable spatial layout format of the two-dimensional panorama picture.

13. The encoding method of claim 9, wherein the default spatial position relationship comprises a plurality of different default spatial position relationships, and the encoding method further comprising encoding an index of the default spatial position relationship among the sub-pictures in the two-dimensional panorama picture, and the index of the default spatial position relationship uniquely indicating one of the different default spatial position relationships.

14. The encoding method of claim 9, further comprising determining whether the applicable spatial layout format of the two-dimensional panorama picture is the same as a default spatial layout format, and determining whether the spatial position relationship among the sub-pictures in the two-dimensional panorama picture in the applicable spatial layout format is the same as the default spatial position relationship in the applicable spatial layout format comprising determining, depending on whether the applicable spatial layout format of the two-dimensional panorama picture is the same as the default spatial layout format, that the spatial position relationship among the sub-pictures in the two-dimensional panorama picture is the default spatial position relationship when the applicable spatial layout format of the two-dimensional panorama picture is the default spatial layout format.

15. The encoding method of claim 9, further comprising determining whether the applicable spatial layout format of the two-dimensional panorama picture is the same as a default spatial layout format, and determining whether the spatial position relationship among the sub-pictures in the two-dimensional panorama picture in the applicable spatial layout format is the same as the default spatial position relationship in the applicable spatial layout format comprising determining whether the spatial position relationship among the sub-pictures in the two-dimensional panorama picture in the applicable spatial layout format is the same as the default spatial position relationship in the applicable spatial layout format when the applicable spatial layout format of the two-dimensional panorama picture is different from the default spatial layout format.

16. The encoding method of claim 9, wherein the spatial position relationship among the sub-pictures in the two-dimensional panorama picture comprises:
an arrangement order of the sub-pictures in the two-dimensional panorama picture;
rotation angles of the sub-pictures in the two-dimensional panorama picture; or
the arrangement order and the rotation angles of the sub-pictures in the two-dimensional panorama picture.

17. A decoding apparatus, comprising:
a memory comprising instructions; and
a processor coupled to the memory, the instructions causing the processor to be configured to:
receive an encoded bitstream of a two-dimensional panorama picture;
determine an applicable spatial layout format of the two-dimensional panorama picture;
parse the encoded bitstream to determine whether a spatial position relationship among sub-pictures in the two-dimensional panorama picture in the applicable spatial layout format is a default spatial position relationship; and
decode the encoded bitstream of the two-dimensional panorama picture based on the applicable spatial layout format and the default spatial position relationship when the spatial position relationship among the sub-pictures in the two-dimensional panorama picture in the applicable spatial layout format is the default spatial position relationship.

18. An encoding apparatus, comprising:
a memory comprising instructions; and
a processor coupled to the memory, the instructions causing the processor to be configured to:
determine an applicable spatial layout format of a two-dimensional panorama picture and a spatial position relationship among sub-pictures in the two-dimensional panorama picture in the applicable spatial layout format;
determine whether the spatial position relationship among the sub-pictures in the two-dimensional panorama picture in the applicable spatial layout format is the same as a default spatial position relationship in the applicable spatial layout format; and
encode indication information indicating that the sub-pictures in the two-dimensional panorama picture in the applicable spatial layout format use the default spatial position relationship, and encode the sub-pictures in the two-dimensional panorama picture based on the applicable spatial layout format and the default spatial position relationship to generate an encoded bitstream when the spatial position relationship among the sub-pictures in the two-dimensional panorama picture in the applicable layout format is the same as the default spatial position relationship in the applicable spatial layout format.

19. The decoding method of claim 1, wherein determining the applicable spatial layout format of the two-dimensional panorama picture comprises:
parsing the encoded bitstream of the two-dimensional panorama picture to obtain an index of the applicable spatial layout format of the two-dimensional panorama picture; and
determining the applicable spatial layout format of the two-dimensional panorama picture based on the index of the applicable spatial layout format.

20. The decoding method of claim 1, wherein the spatial position relationship among the sub-pictures in the two-dimensional panorama picture comprises an arrangement order and rotation angles of the sub-pictures in the two-dimensional panorama picture.

\* \* \* \* \*